US012537433B2

(12) United States Patent
Salus et al.

(10) Patent No.: US 12,537,433 B2
(45) Date of Patent: Jan. 27, 2026

(54) DEVICE, SYSTEM AND METHOD TO DELIVER POWER WITH PHASE CIRCUITS OF AN INTEGRATED CIRCUIT DIE

(71) Applicant: Intel Corporation, Santa Clara, CA (US)

(72) Inventors: Tamir Salus, Zichron Yaakov (IL); Shunjiang Xu, Milpitas, CA (US); Christopher Schaef, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 17/851,997

(22) Filed: Jun. 28, 2022

(65) Prior Publication Data

US 2023/0421040 A1   Dec. 28, 2023

(51) Int. Cl.
| | |
|---|---|
| *G06F 1/18* | (2006.01) |
| *G06F 1/26* | (2006.01) |
| *H02M 1/00* | (2006.01) |
| *H02M 1/088* | (2006.01) |
| *H02M 3/155* | (2006.01) |

(52) U.S. Cl.
CPC ....... *H02M 1/0043* (2021.05); *H02M 1/0012* (2021.05); *H02M 1/088* (2013.01); *H02M 3/155* (2013.01)

(58) Field of Classification Search
CPC ... G06F 1/18; G06F 1/26; G06F 1/263; G05F 3/02; G05F 3/08; H03M 1/66; H02M 1/0003; H02M 1/0043; H02M 1/0016; H02M 1/0012; H02M 1/088
See application file for complete search history.

(56) References Cited

U.S. PATENT DOCUMENTS

| | | | |
|---|---|---|---|
| 11,193,961 B2 * | 12/2021 | Schrom | ..................... H03L 5/00 |
| 12,361,979 B2 * | 7/2025 | Garag | ........................ G06F 1/26 |
| 2016/0239036 A1 | 8/2016 | Paillet et al. | |
| 2020/0264214 A1 | 8/2020 | Schrom et al. | |
| 2022/0014101 A1 | 1/2022 | Schaef et al. | |

* cited by examiner

*Primary Examiner* — Hai L Nguyen
(74) *Attorney, Agent, or Firm* — NICHOLSON DE VOS WEBSTER & ELLIOTT LLP

(57) ABSTRACT

Techniques and mechanisms for facilitating a scalable delivery of current to an inductor of a voltage regulator. In an embodiment, a hardware interface of integrated circuit (IC) die accommodates coupling of the IC die to multiple inductors. The hardware interface comprises contacts which are each to couple the IC die to a respective one of the multiple inductors. A phase circuit of the IC die includes multiple cells which are each coupled to a different respective contact of a plurality of contacts of the hardware interface. A digital controller of the IC die is operable to select any of various combinations of the multiple cells each to conduct a respective current with a corresponding one of the plurality of contacts. In another embodiment, the plurality of contacts are arranged as a multi-row, multi-column array.

20 Claims, 10 Drawing Sheets

DEVICE, SYSTEM AND METHOD TO DELIVER POWER WITH PHASE CIRCUITS OF AN INTEGRATED CIRCUIT DIE

BACKGROUND

1. Technical Field

This disclosure generally relates to voltage regulation and more particularly, but not exclusively, to power delivery via phase circuits of an integrated circuit die.

2. Background Art

In circuits such as interleaved direct current (DC)/DC multiphase converters, active phase management frequently presents a challenge. Specifically, the parallel structure of a multiphase converter such as integrated voltage regulators (IVRs) often requires an accurate balancing of currents through each of the phases in order to achieve the highest possible performance. Failure to adequately balance the currents in the multiphase converter tends to contribute to performance degradation and reliability problems due to over-current and inductor saturation issues.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and mechanisms for providing a scalable delivery of current to an inductor of a voltage regulator. In various embodiments, a hardware interface of integrated circuit (IC) die accommodates coupling of the IC die to multiple inductors. The hardware interface comprises conductive contacts which are each to couple the IC die to a respective one of the multiple inductors. For example, the multiple inductors are to be coupled to the IC die each via a different respective plurality of conductive contacts.

The IC die further comprises a circuit—referred to herein as a "phase circuit" (or, for brevity, simply "phase")—which is to be coupled to a corresponding one of the inductors, wherein the circuit is (re)configurable to drive, at different times, any of various different amounts of output current to the corresponding inductor. For example, a phase circuit comprises multiple component circuits—referred to herein as "bridge cells" (or, for brevity, simply "cells")—which are each operable to conduct current with a different respective one of a plurality of conductive contacts of the hardware interface. Control logic of the IC die is operable to selectively enable a particular combination of one or more such cells each to participate in a delivery of current to the inductor. In one such embodiment, the plurality of conductive contacts are arranged as a multi-row, multi-column array. In providing such an arrangement of the plurality of conductive contacts, some embodiments variously facilitate a space efficient arrangement of multiple phase circuits, and/or enable a voltage regulator to include a larger total number of phase circuits.

Figure 1:
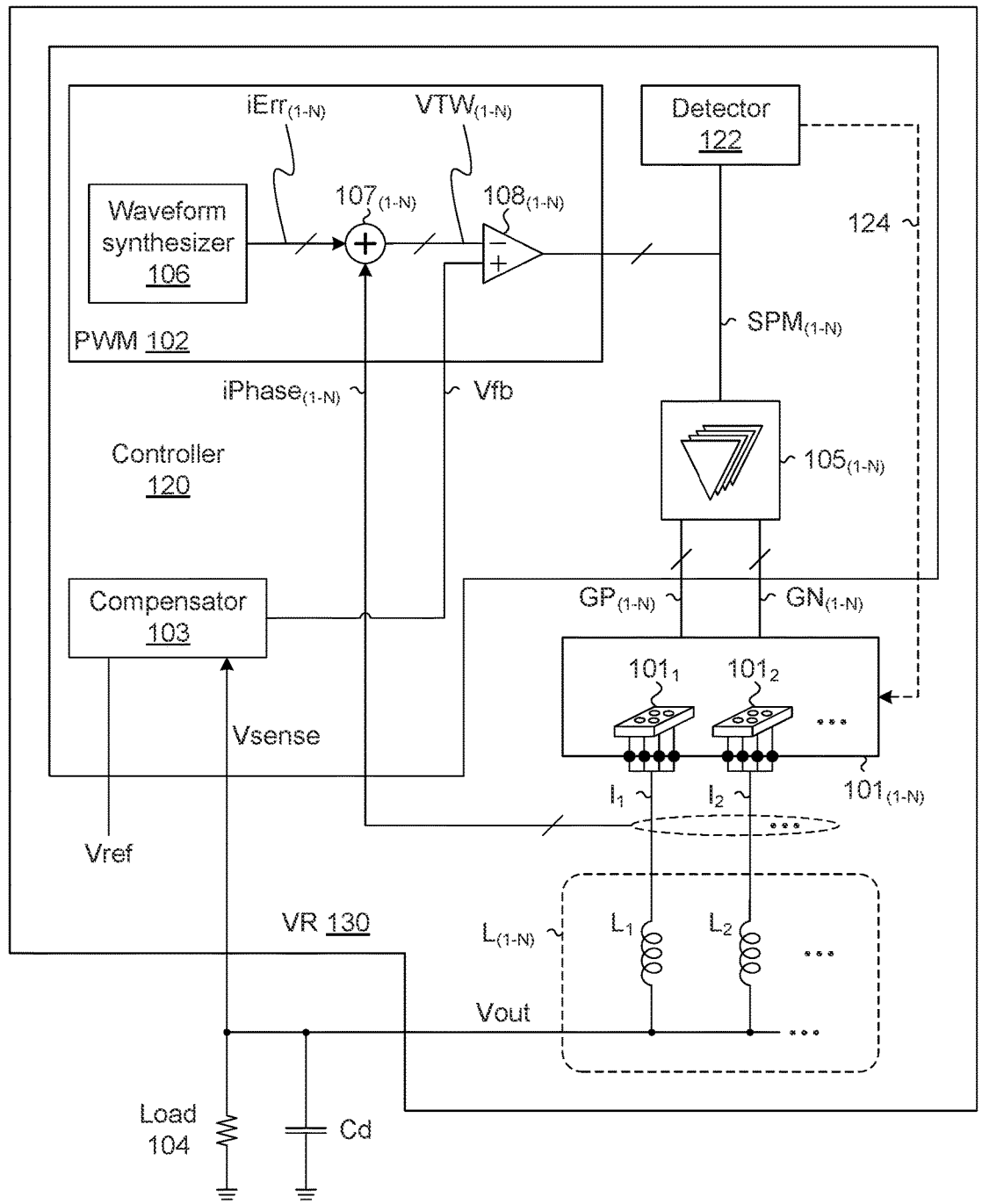
FIG. 1 shows a functional block diagram illustrating features of a system to determine a delivery of power with multiple driver cell circuits according to an embodiment.

FIG. 1 shows a system 100 comprising a voltage regulator (VR) 130 to deliver power with multiple phase circuits and inductors according to an embodiment. System 100 illustrates one embodiment wherein structures of a VR promote scalability of a delivery of current by a given phase circuit to a corresponding inductor. Usually, natural conditions cause a VR to generate currents that often differ between respective phases. In a typical scenario, one phase delivers a 1 Amp (A) current, and another phase delivers a 4 A current. This phase current mismatch causes the VR to lose its efficiency, and also contributes to voltage error in the related output voltage. Embodiments described herein variously mitigate this problem with structures that facilitate an efficient scaling of current delivery.

As shown in FIG. 1, system 100 comprises a VR 130 and a load 104 which is coupled thereto, wherein VR 130 comprises a controller 120 that includes a compensator 103, a pulse width modulator (PWM) 102, a detector 122, and drivers $105_{(1-N)}$. In one embodiment, VR 130 further comprises a plurality of phase circuits $101_{(1-N)}$, where "N" is greater than one. By way of illustration and not limitation, N is equal to 16. In one embodiment, VR 130 further comprises (or alternatively, is to couple to) a plurality of inductors $L_{(1-N)}$ which are to receive current from the plurality of phase circuits $101_{(1-N)}$. In turn, inductors $L_{(1-N)}$ accommodate coupling to deliver power to load circuitry based on the current—e.g., wherein the load circuitry comprises the illustrative a load capacitor (or decoupling capacitor) Cd, and load 104 shown.

A voltage Vout provided to the load circuitry is the output voltage which is regulated by VR 130. In one embodiment, compensator 103 receives a reference voltage Vref and output voltage Vout (same as Vsense) to generate a modified reference voltage Vfb (feedback voltage) for PWM 102. In one embodiment, phase circuits $101_{(1-N)}$ are each coupled to a different respective inductor L from among the plurality of inductors $L_{(1-N)}$. For example, a phase circuit $101_1$ is coupled to an inductor $L_1$, a phase circuit 1012 is coupled to an inductor $L_2$, etc. In one embodiment, a plurality of current sensors (not shown) are coupled to plurality of phase circuits $101_{(1-N)}$ and are operable to sense respective currents $iPhase_{(1-N)}$ for each phase circuit (or "bridge").

In one embodiment, PWM 102 generates a plurality of pulse width modulated signals, $SPM_{(1-N)}$ signals, for timing control and drivers $105_{(1-N)}$. In one embodiment, outputs $GN_{(1-N)}$ and $GP_{(1-N)}$ of timing control and drivers $105_{(1-N)}$ are used to variously control the plurality of phase circuits $101_{(1-N)}$ to generate the regulated voltage Vout. In the illustrative embodiment shown, PWM 102 comprises a waveform synthesizer 106, current mixers $107_{(1-N)}$, and comparators $108_{(1-N)}$. In one embodiment, waveform synthesizer 106 (also referred as wave generator) generates "N" number of triangular waves. In one embodiment, the triangular waves are periodic and have a voltage swing between Vh (high voltage threshold) and Vl (low voltage reference).

In one embodiment, comparator $108_{(1-N)}$ generates one or more PWM signals each for a respective one or more phase circuits. In the example embodiment shown, comparator $108_{(1-N)}$ generates "N" number of PWM signals (i.e., $SPM_{(1-N)}$ signals), each of which drives a corresponding timing control and driver from among timing control and drivers $105_{(1-N)}$. In other embodiments, a given PWM signal is shared by multiple phase circuits—e.g., where each such phase circuit applies a respective adjustment to its received version of that PWM signal. Accordingly, the number of PWM signals is any number between 1 and N, in some embodiments. In various embodiments, a given phase circuit includes or otherwise has access to multiplexer circuitry (not shown) which is operable to select a PWM signal from among multiple PWM signals.

In one embodiment, a given PWM signal—i.e., a given one of $SPM_{(1-N)}$ signals—has a respective duty cycle which varies with DC levels of the inputs to the corresponding one of comparators $108_{(1-N)}$. The strength of current output by phase circuits $101_{(1-N)}$, ripple in current, and voltage Vout depends on the duty cycle of $SPM_{(1-N)}$ signals.

In one embodiment, current mixers $107_{(1-N)}$ each receive a different respective one of the sensed phase currents ($iPhase_{(1-N)}$) of each phase circuit from among phase circuits $101_{(1-N)}$. The current mixers $107_{(1-N)}$ each subtract an average current from all phase circuits $101_{(1-N)}$ to generate a respective one of error currents $iErr_{(1-N)}$ which is used to generate a corresponding one of voltages $VTW_{(1-N)}$ for inputs of corresponding comparators $108_{(1-N)}$. For example, a current mixer $107_1$ receives an indication of a current $iPhase_1$ from phase circuit $101_1$ and subtracts an indication of an average current from $iPhase_1$ to generate an indication $iErr_1$ which is used to generate a voltage $VTW_1$ for a comparator 1081. In such an embodiment, output current of all phase circuits $101_{(1-N)}$ is substantially balanced resulting in phase balancing.

In one embodiment, current sensor signals ($iPhase_{(1-N)}$) are combined and added (or subtracted) by current mixers $107_{(1-N)}$ to the main VR loop at the junction of output of waveform synthesizer 106 and comparators $108_{(1-N)}$. In such an embodiment, the main VR loop (including PWM 102→drivers $105_{(1-N)}$→phase circuits $101_{(1-N)}$→compensator 103) regulates the output voltage Vout while the current sensing loop (including current mixers $107_{(1-N)}$→comparators $108_{(1-N)}$→drivers $105_{(1-N)}$→phase circuits $101_{(1-N)}$→current sensors (not explicitly shown)) checks and maintains that all phases (i.e., phase circuits $101_{(1-N)}$) generate the same amount of current.

The triangle wave (i.e., output of waveform synthesizer 106) of each phase (or bridge) is shifted up or down by an amount proportional to $iErr_{(1-N)} = Iph_{(1-N)} - I_{avg}$, where $iErr_{(1-N)}$ is the difference between the individual phase's current and the average current of all the phases. In one embodiment, shifting the triangle wave up reduces the PWM duty cycle which decreases phase current, and shifting the triangle wave down increases the PWM duty cycle which increases phase current (i.e., from output of phase circuit from among phase circuit $101_{(1-N)}$).

In various embodiments, structures of system 100 efficiently facilitate a scalability of current delivery to inductors of a voltage regulator (VR)—e.g., an integrated VR (IVR)—which, for example, includes some or all of controller 120, phase circuits $101_{(1-N)}$, and inductors $L_{(1-N)}$. In one such embodiment, an integrated circuit (IC) die comprises phase circuits $101_{(1-N)}$ and, for example, further comprises some or all circuitry of controller 120. A hardware interface of the IC die accommodates coupling of the IC die to inductors $L_{(1-N)}$—e.g., wherein system 100 is a packaged device and inductors $L_{(1-N)}$ are formed in a package which encapsulates the IC die. The hardware interface includes multiple conductive contacts (e.g., comprising metal pads, microbumps, balls or other suitable structures), some or all of which are each coupled to a respective one of inductors $L_{(1-N)}$.

In an embodiment, phase circuits $101_{(1-N)}$ each comprise a respective plurality of cells, wherein each such cell comprises a respective bridge circuit, and a respective switch circuit which is to selectively provide (or prevent) one or more conductive paths which are to be used for the cell to output a current generated with the bridge circuit. Controller 120 further comprises a detector 122 which includes circuit logic—e.g., comprising a state machine, programmable gate array, application specific integrated circuit, and/or the like—which is operable to generate one or more control signals (such as the illustrative switch control signals 124 shown) to selectively enable, for a given one of phase circuits $101_{(1-N)}$, a particular combination of one or more contacts by which that phase circuit is to drive current to a corresponding one of inductors $L_{(1-N)}$. By way of illustration and not information, detector 122 generates control signals 124 based on an indication by $SPM_{(1-N)}$—and/or by any of various other types of power performance information—that a particular one of phase circuits $101_{(1-N)}$ needs to drive more current (or alternatively, less current) to the corresponding one of inductors $L_{(1-N)}$.

For example, phase circuit $101_1$ comprises a first plurality of cells which each correspond to (e.g., are each coupled to) a different respective one of first conductive contacts of the hardware interface. Responsive to controller 120, different ones of the first plurality of cells are to be variously operated each to selectively enable, or disable, a respective conduction of current with the corresponding one of the first conductive contacts. In an illustrative scenario according to one embodiment, phase circuit $101_1$ comprises a first cell and a second cell which are coupled, respectively, to a first conductive contact and second conductive contact. The first cell comprises a first bridge circuit which is operable to generate a first current based on a first one or more bridge driver signals (e.g., including a first one of the outputs $GP_{(1-N)}$ and a first one of the outputs $GN_{(1-N)}$). The first cell further comprises a first switch circuit which is to selectively provide—or prevent—a first one or more conductive paths based on a first cell selection signal (e.g., one of the illustrative switch control signals 124 shown). When provided, the first one or more conductive paths enable the first bridge circuit to conduct the first current with the first conductive contact.

Similarly, the second cell of phase circuit $101_1$ comprises a second switch circuit, and a second bridge circuit which is operable to generate a second current based on the same first one or more bridge driver signals. The second switch circuit is to selectively provide—or prevent—a second one or more conductive paths based on a second cell selection signal (e.g., a different one of the illustrative switch control signals 124 shown). When provided, the second one or more conductive paths enable the second bridge circuit to conduct the second current with the second conductive contact. In one such embodiment, any of various combinations of one or more cells of phase circuit $101_1$ are selected each output a different respective one of one or more currents, which are combined as current $I_1$.

In various embodiments, the first conductive contacts—each coupled between inductor $L_1$ and a different respective cell of phase circuit $101_1$—are arranged relative to each other as a first array which comprises multiple rows and multiple columns. For example, two or more of the first conductive contacts are in different respective rows of the array, and different respective rows of the array. Additionally or alternatively some or all others of the phase circuits $101_{(1-N)}$ each comprise cells which are similarly coupled to a respective multi-row, multi-column contact array of the hardware interface. In providing a phase circuit accommodates coupling to an inductor via such an array of conductive contacts, some embodiments facilitate scalability—in more than one dimension—of a number of current paths through the plane of an IC die's hardware interface.

Figure 2A:
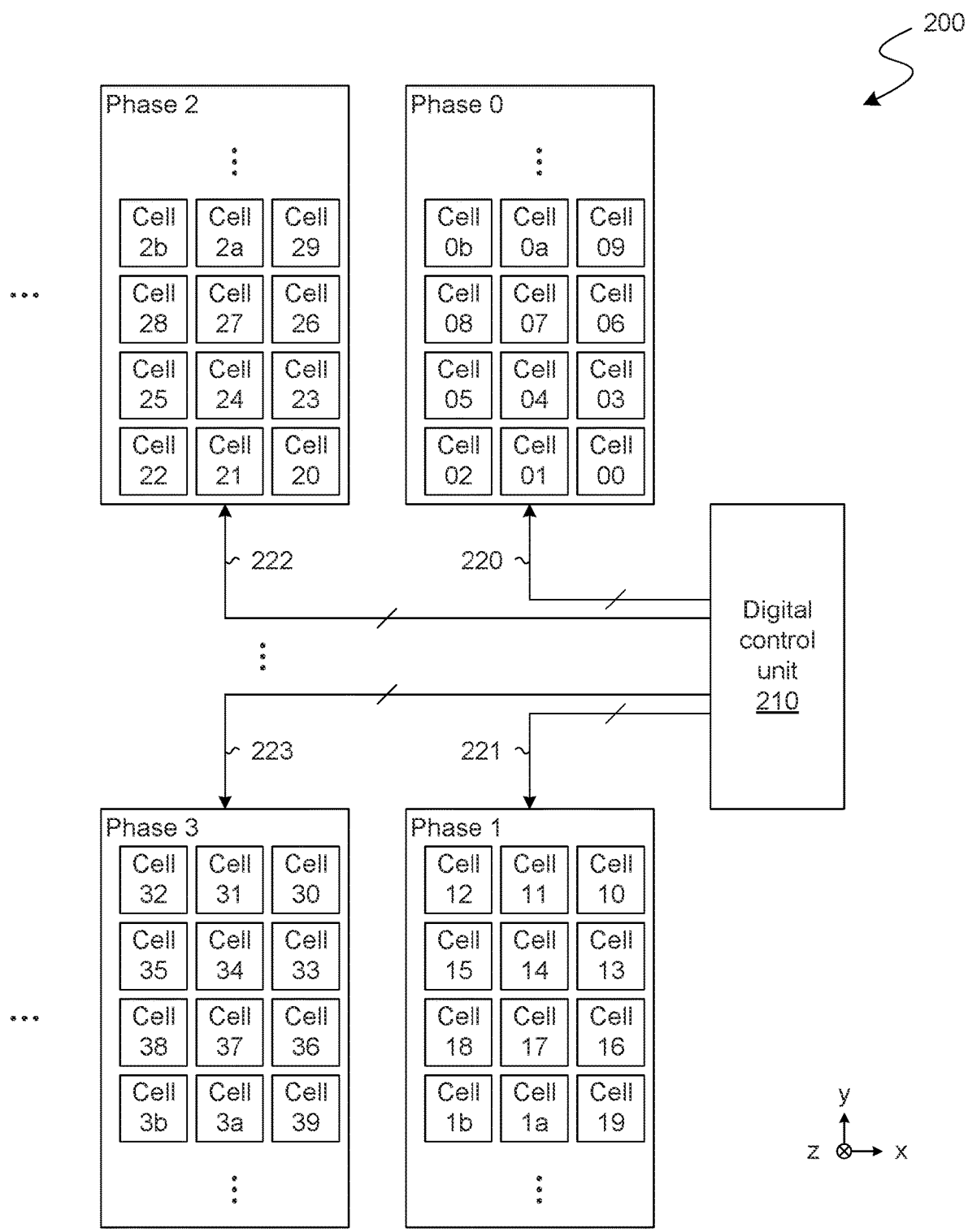
FIGS. 2A, 2B show functional block diagrams each illustrating features of a respective integrated circuit (IC) die to facilitate voltage regulation functionality according to an embodiment.

FIG. 2A shows an IC die 200 which, according to an embodiment, supports voltage regulator functionality to selectively provide current to an inductor via any of various combinations of one or more cells. IC die 200 illustrates one example of an embodiment wherein a phase circuit comprises multiple cells, wherein each of the cells is operable to selectively provide a conductive path to a corresponding conductive contact of a hardware interface. In some embodiments, the multiple cells each correspond to a different respective one of conductive contacts which, for example, form a multi-row, multi-column array.

As shown and FIG. 2A, IC die 200 comprises a digital control unit (DCU) 210 and multiple phase circuits coupled thereto—e.g., wherein the multiple phase circuits comprise the illustrative phases 0 through 3 shown. DCU 210 provides to phases 0 through 3 respective signals to determine a delivery of power via one or more inductors (not shown) which are to be coupled to IC die 200. By way of illustration and not limitation, DCU 210 provides one or more signals 220 to phase 0, one or more signals 221 to phase 1, one or more signals 222 to phase 2, and/or one or more signals 223 to phase 3. In one such embodiment, DCU 210 correspond functionally to controller 120, and phases 0 through 3 correspond functionally to phase circuits $101_{(1-N)}$—e.g., wherein signals 220-223 provide functionality such as that of outputs $GP_{(1-N)}$, outputs $GN_{(1-N)}$, and/or control signals 124.

In an embodiment, a hardware interface (not shown) of IC die 200 accommodates coupling of IC die 200 to multiple inductors (not shown), wherein a voltage regulator—comprising circuitry of IC die 200—is to deliver power to a load circuit via one or more of the multiple inductors. The hardware interface comprises multiple conductive contacts (e.g., including pads, microbumps and/or any of various other suitable conductors) which are each to couple to a respective one of the multiple inductors.

For a given one of phases 0 through 3, the phase comprises a plurality of cells which are each coupled to (or alternatively, which each include) a different respective one of the multiple conductive contacts. In one such embodiment, conductive contacts which are coupled to the same given phase form an array—referred to herein as a "multi-row, multi-column array"—which includes two or more rows of conductive contacts, and two or more columns of conductive contacts.

By way of illustration and not limitation, the hardware interface of IC die 200 comprises a first plurality of conductive contacts which accommodate coupling of IC die 200 to a first inductor, wherein the first plurality of conductive contacts are arranged relative to each other to form a first multi-row, multi-column array. The first plurality of conductive contacts each accommodate coupling to a first inductor which is to be available to deliver power to a load circuit.

In one such embodiment, phase 0 comprises first cells 00-0b which each correspond to (and are to selectively conduct current with) a different respective one of the first plurality of conductive contacts. Although some embodiments are not limited in this regard, cells of a given phase circuit are also arranged in a multi-row, multi-column array configuration—e.g., wherein cells 00 through 0B of phase 0 form a 4×3 cell array. In other embodiments, such a cell array includes a different total number of multiple rows and/or a different total number of multiple columns. For a given cell of a phase circuit—e.g., for a given one of cells 00 through 0B—the cell comprises a respective bridge circuit, and respective switch circuitry which is operable to selectively enable (or alternatively disable) one or more conductive paths which are to facilitate a conduction of current between said bridge circuit and the corresponding conductive contact.

In one such embodiment, cell 00 (for example) includes a first bridge circuit which accommodates coupling to receive two voltages—e.g., including a supply voltage VCC, and a reference potential such as a ground voltage. Furthermore, an output of the first bridge circuit includes, or otherwise accommodates a conduction of current with, a corresponding one of the first plurality of conductive contacts. The first bridge circuit is operable to conduct current between either of the two voltages and the output. In one such embodiment, signal(s) 220 comprise first bridge driver signals GP0, GN0 which are to be made available for variously operating any combination of the respective bridge circuits of cells 00-0b. Cell 00 further comprises a first one or more switch circuits which are operable to selectively provide (or prevent) at least one conductive path, to enable (or disable) such conducting of current with the first bridge circuit and the first conductive contact. In one such embodiment, signal(s) 220 further comprises a first one or more cell selection signals to variously operate the respective switch circuits of cells 00-0b.

In various embodiments, cell 01 similarly comprises a second bridge circuit which accommodates coupling to receive the two voltages and, for example, to further receive the bridge driver signals which are provided to cell 00. In one such embodiment, cell 01 further comprises a second one or more switch circuits which are operable to selectively provide (or prevent) one or more conductive paths, to enable (or disable) a conducting of current with the second bridge circuit and a second conductive contact. Similarly, each of the other cells 02 through 0B of phase 0 are variously operable so that any of various combinations of cells 00-0b are selectable to drive current between either of the two voltages and the first plurality of conductive contacts.

In some embodiments, the hardware interface of IC die 200 further comprises a second plurality of conductive contacts which accommodate coupling of IC die 200 to a second inductor, wherein the second plurality of conductive contacts are arranged relative to each other to form a second multi-row, multi-column array. In one such embodiment, phase 1 comprises second cells 10-1b which each correspond to (and are to selectively conduct current with) a different respective one of the second plurality of conductive contacts. The second cells 10-1b of phase 1 each comprise a respective bridge circuit and respective switch circuitry to provide functionality—similar to that of cells 00-0b— for conducting current with the second inductor via any of various combinations of the second plurality of conductive contacts. In one such embodiment, signal(s) 221 comprises second bridge driver signals GP1, GN1 which are to be made available to variously operate some or all of the respective bridge circuits of cells 10-1b. Alternatively or in addition, signal(s) 221 comprise a second one or more cell selection signals to variously operate the respective switch circuits of cells 10-1b.

In some embodiments, the hardware interface of IC die 200 further comprises a third plurality of conductive contacts which accommodate coupling of IC die 200 to a third inductor, wherein third plurality of conductive contacts are arranged relative to each other to form a third multi-row, multi-column array. In one such embodiment, phase 2 comprises third cells 20-2b which each correspond to (and are to selectively conduct current with) a different respective one of the third plurality of conductive contacts. In one such embodiment, signal(s) 222 comprises third bridge driver signals GP2, GN2 which are to be made available to variously operate some or all of the respective bridge circuits of cells 20-2b. Additionally or alternatively, signal(s) 222 comprise a third one or more cell selection signals to variously operate the respective switch circuits of cells 20-2b.

In some embodiments, the hardware interface of IC die 200 further comprises a fourth plurality of conductive contacts which accommodate coupling of IC die 200 to a fourth inductor, wherein fourth plurality of conductive contacts are arranged relative to each other to form a fourth multi-row, multi-column array. In one such embodiment, phase 3 comprises fourth cells 30-3b which each correspond to (and are to selectively conduct current with) a different respective one of the fourth plurality of conductive contacts. In one such embodiment, signal(s) 223 comprises fourth bridge driver signals GP3, GN3 which are to be made available to variously operate some or all of the respective bridge circuits of cells 30-3b. Additionally or alternatively, signal(s) 223 comprise a fourth one or more cell selection signals to variously operate the respective switch circuits of cells 30-3b.

Figure 2B:
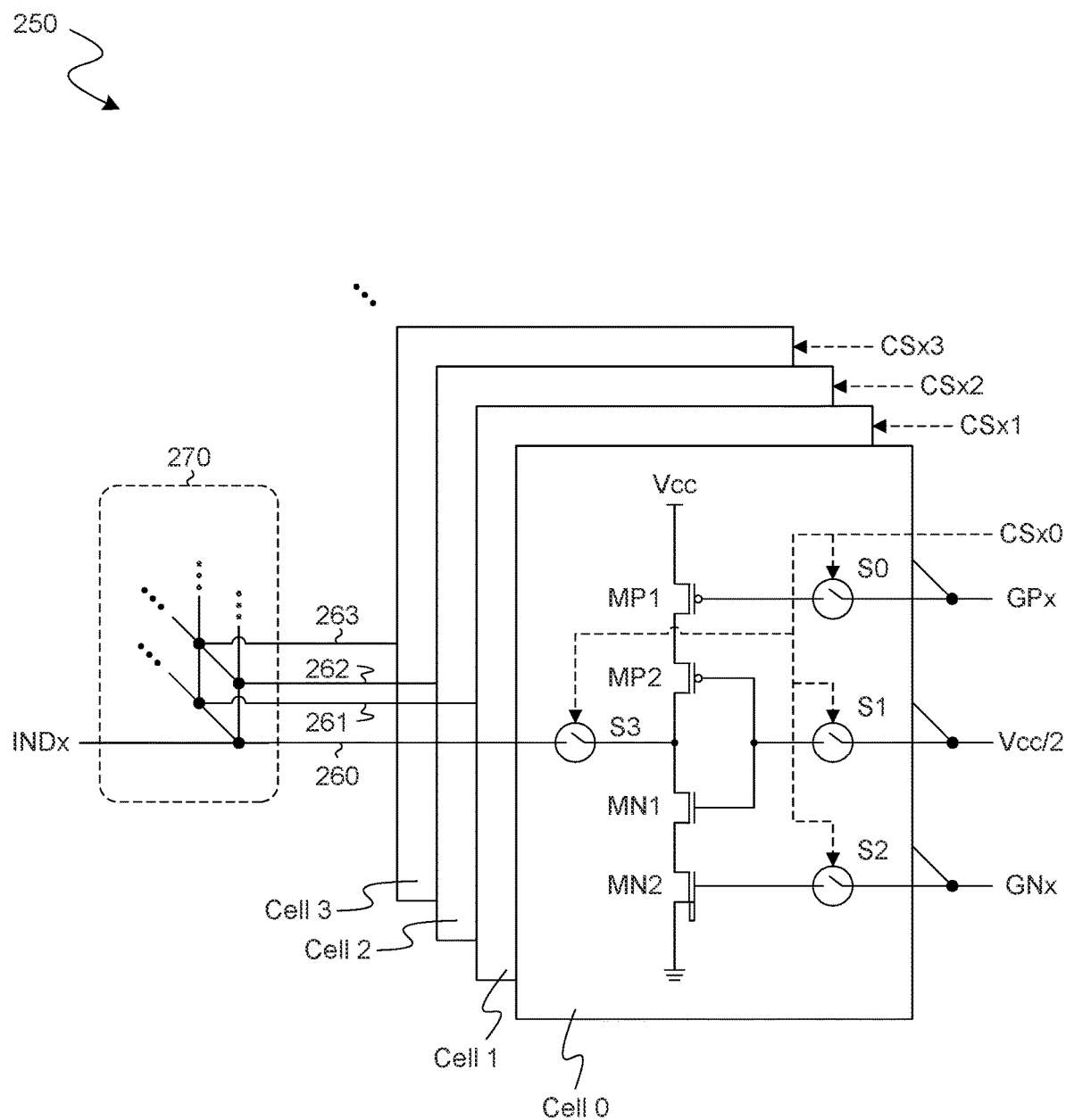

FIG. 2B shows a phase circuit 250 which is operable to selectively provide current to an inductor via any of various combinations of conductive contacts according to an embodiment. Phase circuit 250 illustrates an embodiment which comprises multiple cells which each include a respective bridge circuit and a respective one or more switches. The multiple cells are coupled each to a different respective conductive contact of a hardware interface—e.g., wherein phase circuit 250 is to be coupled to an inductor via conductive contacts which form a multi-row, multi-column array. In one such embodiment, phase circuit 250 includes features of one of phase circuits $101_{(1-N)}$, or of one of the phases 0 through 3 of IC die 200.

As shown in FIG. 2B, phase circuit 250 comprises cells 0-3 which each correspond to a different respective conductive contact in a multi-row, multi-column array 270. Cell 0 includes a first bridge circuit which accommodates coupling to receive both a supply voltage Vcc, and a ground voltage (or other reference potential). In one such embodiment, the first bridge circuit comprises an in-series arrangement of PMOS transistors MP1, MP2 and NMOS transistors MN1, MN2. The first bridge circuit is operable—responsive to bridge driver signals GPx, GNx from a digital controller—to conduct current between an output of the first bridge circuit and either of the supply voltage Vcc or the ground voltage. In one such embodiment, the other cells 1-3 of phase circuit 250 each include a similar bridge circuit which is also coupled to receive the supply voltage Vcc, the ground voltage, and the bridge driver signals GPx, GNx.

In the example embodiment shown, cell 0 further comprises a first one or more switch circuits—e.g., including some or all of the illustrative switches s0 through s3 shown. The first one or more switch circuits are operable to selectively provide (or prevent) at least one conductive path, to enable (or disable) the conduction of a current—via a line 260—between the first bridge circuit and a corresponding first contact of array 270. By way of illustration and not limitation, a digital control unit—or other suitable circuit logic—provides to cell 0 a selection signal CSx0 which, for example, configures one or more of switches S0, S1, S2 to enable (or disable) operation of the first bridge circuit based on signals GPn, GPn. Alternatively or in addition, selection signal CSx0 configures switch S3 to provide (or prevent) a conductive path between an output node of the first bridge circuit and the first contact.

In one such embodiment, each of the other cells 1-3 of phase circuit 250 similarly further comprise a respective one or more switch circuits to enable (or disable) the conduction of current with array 270. By way of illustration and not limitation, switch circuitry of phase 1 is coupled to receive a selection signal CSx1 which selectively enables or disables the conduction of a current—via a line 261—between phase 1 and a corresponding second contact of array 270. Alternatively or in addition, switch circuitry of phase 2 is coupled to receive a selection signal CSx2 which selectively enables or disables the conduction of a current—via a line 262— between phase 2 and a corresponding third contact of array 270. Alternatively or in addition, switch circuitry of phase 3 is coupled to receive a selection signal CSx3 which selectively enables or disables the conduction of a current—via a line 263—between phase 3 and a corresponding fourth contact of array 270.

In an illustrative scenario according to one embodiment, one or more currents—each generated by a different respective one of phases 0 through 3 based on signals GPx, GNx— are communicated each via a corresponding one of lines 260-263 and merged into a current INDx which is then conducted by an inductor (not shown) that is driven with phase circuit 250.

Figure 3:
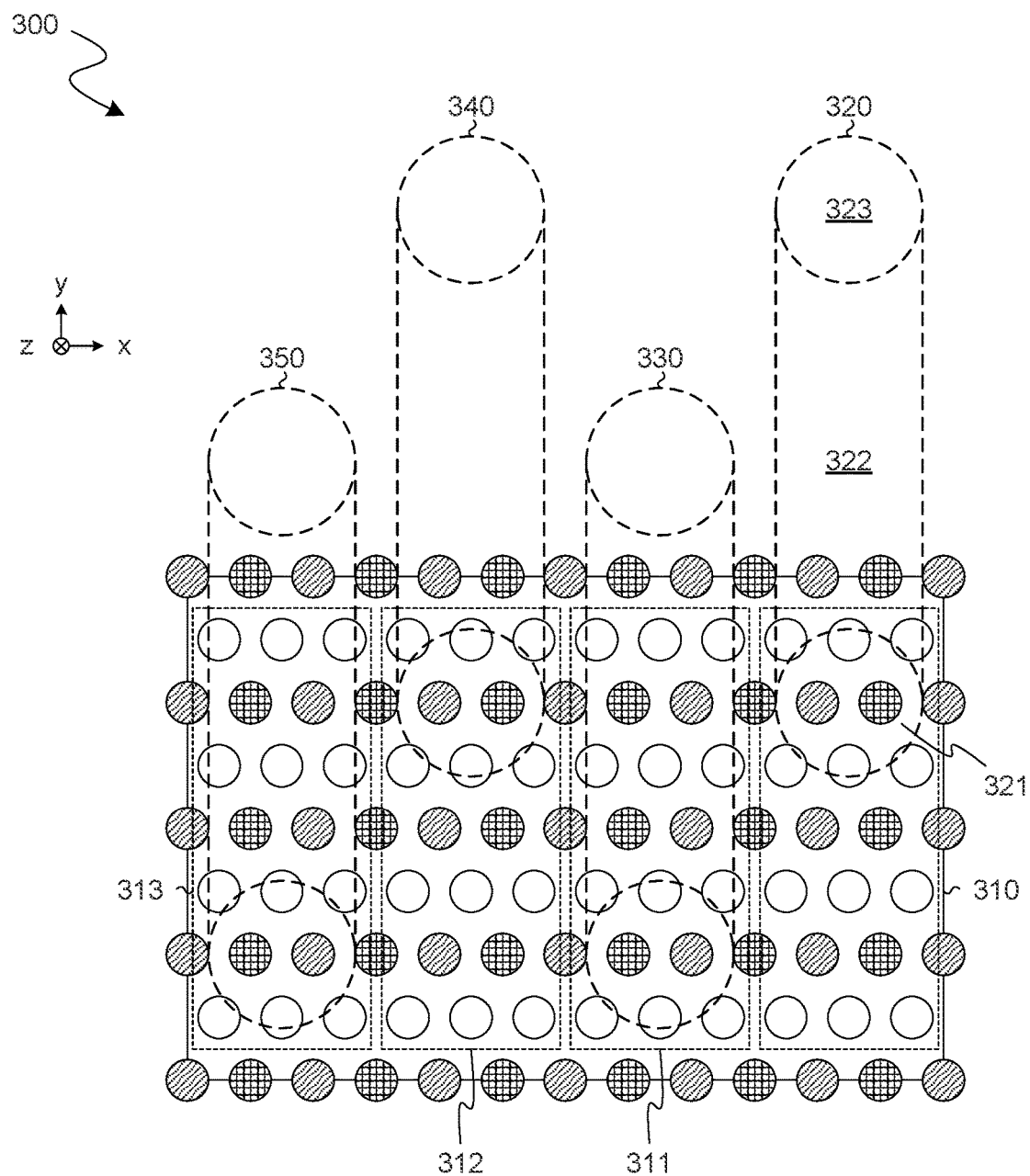
FIG. 3 shows a layout diagram illustrating features of an IC die which comprises a hardware interface for coupling phase circuits to respective inductors according to an embodiment.

FIG. 3 shows features of a IC die 300 which comprises phase circuits and hardware interface structures to variously deliver power via respective inductors according to embodiment. IC die 300 illustrates one embodiment which comprises phase circuits, as well as a hardware interface comprising conductive contacts which are to variously couple respective cells of the phase circuits each to a respective one of one of multiple inductors. In an embodiment a plurality of such conductive contacts are each to be coupled to the same inductor, wherein the plurality of conductive contacts form a multi-row, multi-column array. For example, IC die 300 includes features of phase circuits $101_{(1-N)}$ or of IC die 200, in some embodiments.

As shown in FIG. 3, a hardware interface of IC die 300 accommodates coupling of IC die 300 to multiple inductors—e.g., wherein the multiple conductors correspond functionally to inductors $L_{(1-N)}$. Phase circuits of IC die 300 each comprise a different respective plurality of cells, wherein the hardware interface of IC die 300 comprises multiple conductive contacts which are variously coupled each to a respective cell.

Referring now to legend 301, the hardware interface comprises contacts 304 which are each to provide a ground voltage to a corresponding cell. The hardware interface further comprises contacts 306 which are each to provide a supply voltage Vcc to a corresponding cell. In one such embodiment, the hardware interface further comprises output contacts 302 which are variously coupled each to a different respective cell of the phase circuits. During operation of IC die 300, some or all such cells are variously operable each to provide an output current to the corresponding one of contacts 302.

In the example embodiment shown, the output contacts 302 comprise a first plurality of conductive contacts which are arranged, relative to each other, to form a first multi-row, multi-column array in a region 310. Although some embodiments are not limited in this regard, some of ground voltage contacts 304 and/or some of supply voltage contacts 306 are variously between and/or among respective contacts of said first array. A first phase of IC die 300 comprises first cells which are each coupled to a different respective one of the first plurality of contacts.

The hardware interface accommodates coupling of IC die 300 to a first inductor via each of the first plurality of conductive contacts. In an illustrative scenario according to one embodiment, the first inductor extends over (or alternatively, under) a footprint area 320 which at least partially overlaps region 310. For example, portions 321, 323 of footprint area 320 each correspond to a different respective one of two portions of the first inductor, wherein the two portions variously extend each in a vertical (z-axis) direction which is orthogonal to a x-y plane of the hardware interface. Another portion 322 of footprint area 320 corresponds to an additional portion of the first inductor, wherein the additional portion extends horizontally to join the two other portions of the first inductor. By way of illustration and not limitation, some embodiments comprise a packaged device which includes IC die 300, and one or more inductors which are variously coupled to IC die 300, and are variously formed in a package mold of the packaged device. In one such embodiment, the first inductor comprises only a single winding structure.

In one such embodiment, output contacts 302 further comprise a second plurality of conductive contacts which form a second multi-row, multi-column array in a region 311. A second phase of IC die 300 comprises second cells which are each coupled to a different respective one of the second plurality of contacts. The hardware interface accommodates coupling of IC die 300 to a second inductor via each of the second plurality of conductive contacts. For example, the second inductor extends over (or alternatively, under) a footprint area 330 which at least partially overlaps region 311.

Furthermore, output contacts 302 comprise a third plurality of conductive contacts which form a third multi-row, multi-column array in a region 312. A third phase of IC die 300 comprises third cells which are each coupled to a different respective one of the third plurality of contacts. The hardware interface accommodates coupling of IC die 300 to a third inductor via each of the third plurality of conductive contacts. For example, the third inductor extends over (or alternatively, under) a footprint area 340 which at least partially overlaps region 312.

Further still, output contacts 302 comprise a fourth plurality of conductive contacts which form a fourth multi-row, multi-column array in a region 313. A fourth phase of IC die 300 comprises fourth cells which are each coupled to a different respective one of the fourth plurality of contacts. The hardware interface accommodates coupling of IC die 300 to a fourth inductor via each of the fourth plurality of conductive contacts. For example, the fourth inductor extends over (or alternatively, under) a footprint area 350 which at least partially overlaps region 313.

Figure 4:
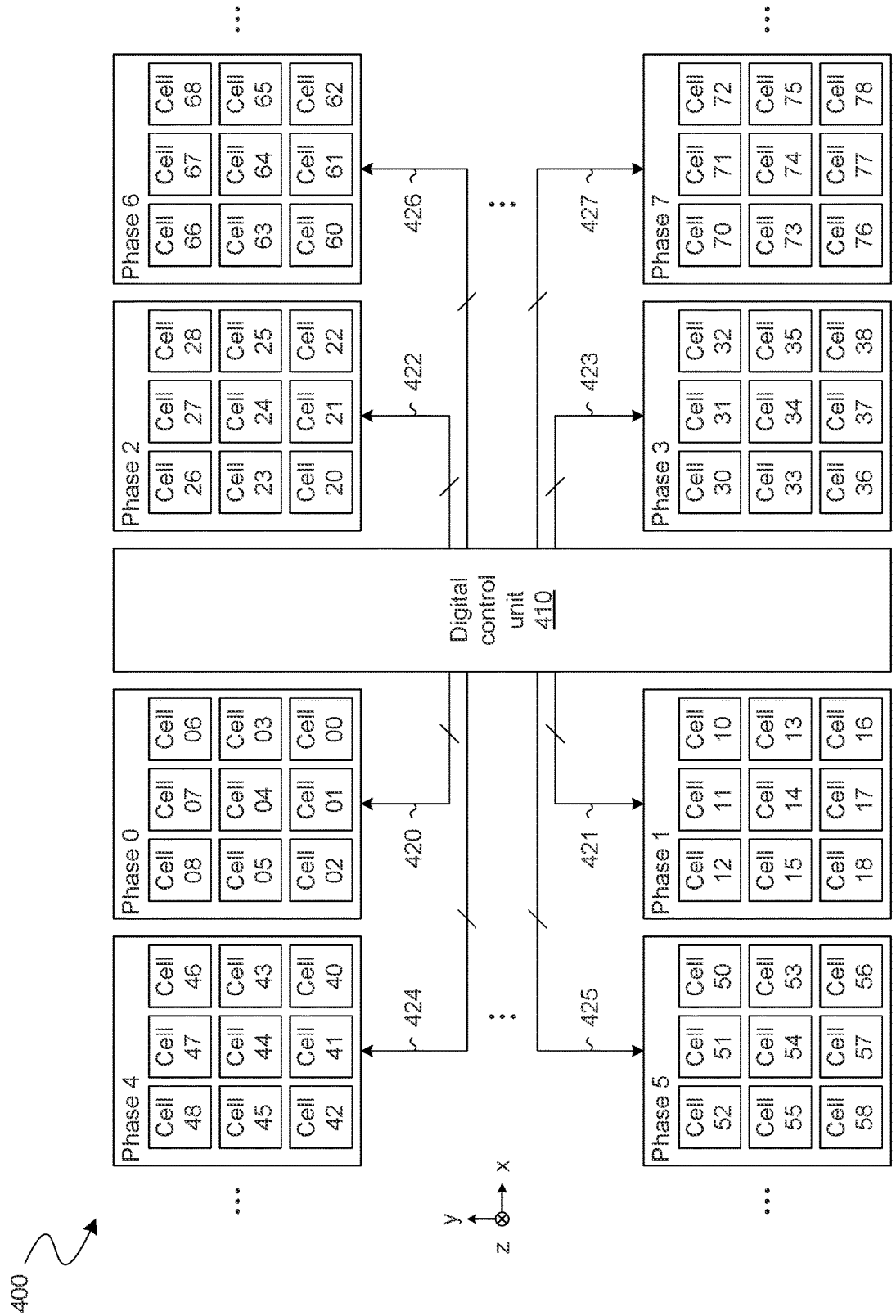
FIGS. 4 and 5 show functional block diagrams illustrating features of respective IC dies which each support voltage regulation functionality according to a corresponding embodiment.

FIG. 4 shows features of an IC die 400 which is to facilitate functionality of a voltage regulator according to another embodiment. IC die 400 illustrates one embodiment wherein a digital control unit of a voltage regulator is arranged in a butterfly configuration with multiple phase circuits that each comprise a respective plurality of cells. For example, IC die 400 includes features of system 100—e.g., wherein IC die 400 provides functionality such as that of IC die 200 and/or IC die 300.

As shown in FIG. 4, IC die 400 comprises a digital control unit (DCU) 410 and multiple phase circuits which are variously couple thereto—wherein the multiple phase circuit comprise the illustrative phases 0-7 shown. For example, DCU 410 corresponds functionally to controller 120 or DCU 210—e.g., wherein phases 0-7 provide functionality such as that of phase circuits $101_{(1-N)}$.

For a given one of phases 0-7, the phase comprises a plurality of cells which are each coupled to (or alternatively, which each include) a different respective one of the multiple conductive contacts. By way of illustration and not limitation, phase 0 comprises cells 01-08, wherein phase 1 comprises cells 11-18, phase 2 comprises cells 21-28, and phase 3 comprises cells 31-38. Similarly, phase 4 comprises cells 41-48, wherein phase 5 comprises cells 51-58, phase 6 comprises cells 61-68, and phase 7 comprises cells 71-78. Some or all of the cells of phases 0-7 each provide functionality similarly that of the cells 0-3 of phase circuit 250, for example.

DCU 410 provides to phases 0-7 respective signals to determine a delivery of power via one or more inductors (not shown) which are to be coupled to IC die 400. By way of illustration and not limitation, DCU 410 provides one or more signals 420 to phase 0, one or more signals 421 to phase 1, one or more signals 422 to phase 4, and/or one or more signals 423 to phase 3. Furthermore, DCU 410 provides one or more signals 424 to phase 4, one or more signals 425 to phase 5, one or more signals 426 to phase 6, and/or one or more signals 427 to phase 7. In one such embodiment, signals 420-427 variously provide functionality such as that of outputs $GP_{(1-N)}$, outputs $GN_{(1-N)}$, and/or control signals 124.

In the example embodiment shown, a first plurality of phases—e.g., comprising phases 0, 1, 4 and 5—are each in a first region which extends on a first side of DCU 410. For example, phases 0 and 1 are opposite each other—and phases 4 and 5 are similarly opposite each other—on the first side of DCU 410. By contrast, a second plurality of phases—e.g., comprising phases 2, 3, 6 and 7—are each in a second region which extends on a second side of DCU 410 which is opposite the first side. For example, phases 2 and 3 are opposite each other—and phases 6 and 7 are similarly opposite each other—on the second side of DCU 410. In positioning DCU 410 is such a "butterfly" configuration—i.e., between the first plurality of phases, and the second plurality of phases—some embodiments variously provide for a relatively short communication of some or all of signals 420-427 along the x-axis shown. Additionally or alternatively, such a butterfly configuration enables DCU 410 to support a larger arrangement of phase circuits along the x-axis.

In an embodiment, a hardware interface (not shown) of IC die 400 accommodates coupling of IC die 400 to multiple inductors (not shown), wherein a voltage regulator—comprising circuitry of IC die 400—is to deliver power to a load circuit via one or more of the multiple inductors. The hardware interface comprises multiple conductive contacts which are each to couple to a respective one of the multiple inductors.

For a given one of phases 0-7, the hardware interface comprises a respective plurality of conductive contacts which are coupled each to a different respective cell of that phase. Although some embodiments are not limited in this regard, such as plurality of conductive contacts are arranged relative to each other to form (for example) a multi-row, multi-column array. Additionally or alternatively, the cells of that given phase—including cells 00-08 of phase for example—are themselves arranged to similarly form a multi-row, multi-column cell array, in some embodiments.

Figure 5:
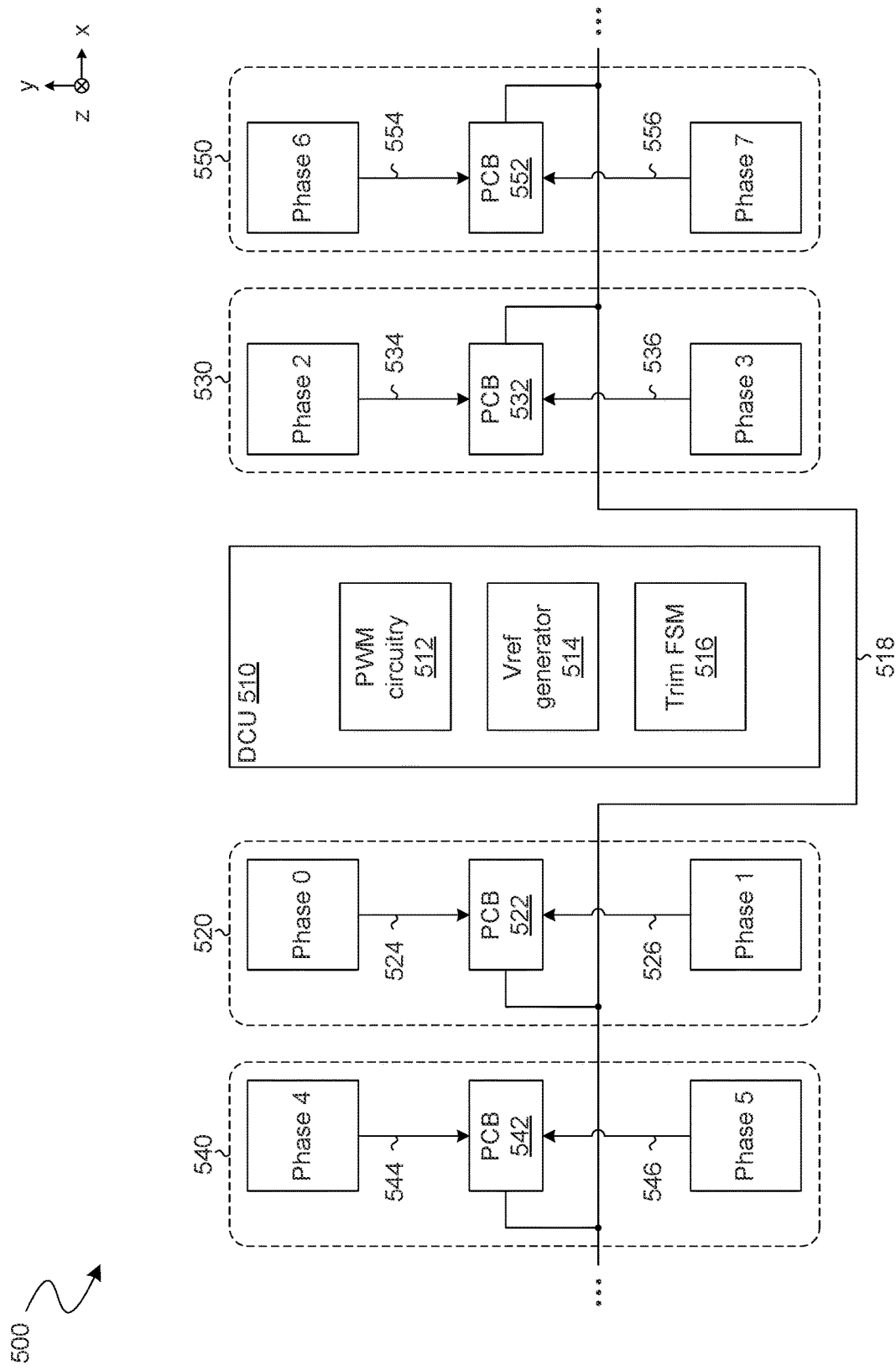

FIG. 5 shows features of an IC die 500 to provide functionality of a voltage regulator (VR) which comprises a distributed phase current balancing architecture according to an embodiment. IC die 500 illustrates one embodiment wherein multiple phase current balancer (PCB) circuits each correspond to a different respective two or more phase circuits of a VR. For a given one of the PCB circuits, the circuit is coupled to receive from each of the corresponding two or more phase circuits an indication of the respective current which is output by that phase circuit. The multiple PCB circuits are further coupled to each other to determine an indication of an average amount of current which is being output by multiple phases including (for example) all phases of the IVR. Based on such a configuration, the multiple PCB circuits variously provide signals to facilitate pulse width modulation at the VR.

As shown in FIG. 5, IC die 500 comprises a DCU 510 and multiple phases which are a couple thereto—e.g., wherein the multiple phase circuits comprise the illustrative phases 0-7 shown. DCU 410 is coupled to provide various signals (not shown) to facilitate operation of phases 0-7—e.g., wherein said signals provide functionality such as that of outputs $GP_{(1-N)}$, outputs $GN_{(1-N)}$, and/or control signals 124. In some embodiments, DCU 510 corresponds functionally to one of controller 120, DCU 210, or DCU 410—e.g., wherein phases 0-7 provide functionality similar to that of phase circuits $101_{(1-N)}$, that of phases 0-3 of IC die 200, or that of phases 0-7 of IC die 400.

In the illustrative embodiment shown, a phase pair 520 of IC die 500 comprises the phases 0, 1 which are positioned opposite each other—e.g., wherein another phase pair 530 comprises the opposing phases 2, 3, wherein another phase pair 540 comprises the opposing phases 4, 5, and wherein another phase pair 550 comprises the opposing phases 6, 7. IC die 500 further comprises phase current balancer circuits PCB 522, PCB 532, PCB 542, and PCB 552 which correspond to—and are variously coupled to—phase pair 520, phase pair 530, phase pair 540, and phase pair 550 (respectively).

PCB 522 is coupled to receive signals 524, 526 which indicate (respectively) the current being output by phase 0, and the current being output by phase 1. Furthermore, PCB 532 is coupled to receive signals 534, 536 which indicate the respective currents being output by phases 2, 3. Further still, PCB 542 is coupled to receive signals 544, 546 which indicate the respective currents being output by phases 4, 5—e.g., wherein PCB 552 receives signals 554, 556 indicating the respective currents output by phases 6, 7. In one such embodiment, PCBs 522, 532, 542, 552 are further coupled to each other to generate a signal 518 which indicates a total average amount of current being output by phases 0-7. Based on the communication of these various signals, PCBs 522, 532, 542, 552 generate respective signals which each a respective adjustment to be made with pulse width modulator circuitry 512 of DCU 510.

As described herein, a given one of the PCBs 522, 532, 542, 552 comprises variable resistors which are used to determine a pulse width modulation adjustment. In various embodiments, a trim finite state machine 516 (or other suitable logic of DCU 510) subjects the given PCB circuit to a trimming operation which adjusts one or both of the variable resistors. In one such embodiment, the trimming operation is based on a reference voltage which, for example, is indicated to the given PCB circuit by a reference voltage (Vref) generator 514 of DCU 510.

Figure 6A:
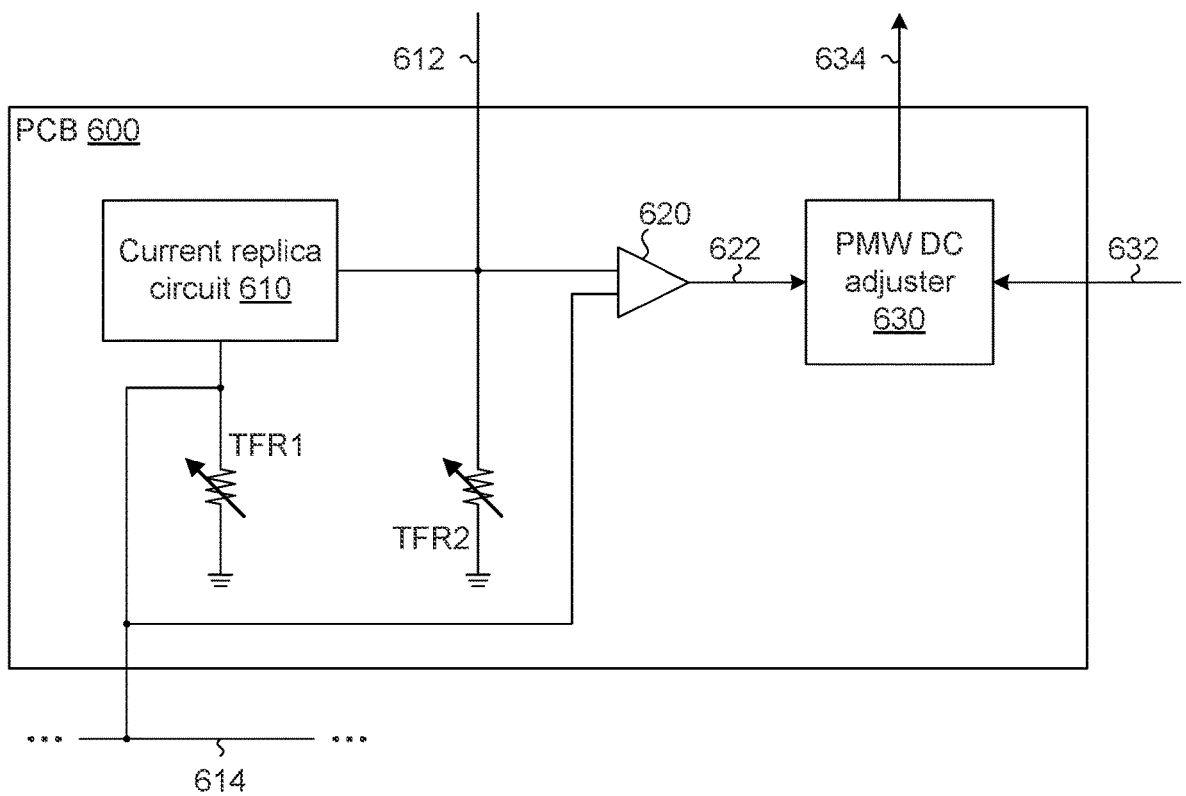
FIG. 6A shows a functional block diagram illustrating features of a circuit which is to support phase and current balancing according to an embodiment.

FIG. 6A shows features of a phase current balancer circuit PCB 600 which accommodates operation in a distributed phase current balancing architecture according to an embodiment. PCB 600 illustrates one embodiment comprising circuitry which facilitates functionality of a voltage regulator (VR), wherein the circuitry is to be coupled to two or more phase circuits of the VR. The circuitry generates, with one or more similar phase current balancer circuits of the VR, a shared signal which indicates an average amount of current output by phase circuits of the voltage regulator. Additionally or alternatively, the circuitry generates a signal to adjust a pulse width modulation by the VM. In some embodiments, PCB 600 corresponds functionally to one of the PCBs 522, 532, 542, 552.

As shown in FIG. 6A, PCB 600 accommodates coupling to receive one or more signals—e.g., including the illustrative local output current 612 shown—which specifies or otherwise indicates a total amount of a current which is generated by two (or more) phase circuits which are "local" to PCB 600. By way of illustration and not limitation, PCB 600 is PCB 522, wherein the "local" output current 612 includes or is otherwise based on a combination of signals 524, 526.

PCB 600 further accommodates coupling to one or more other PCB circuits (not shown) to facilitate the generation of a signal 614 (such as signal 518) which indicates a total amount of a "global" average current being output by all phase circuits of the VR. In the example embodiment shown, PCB 600 comprises a variable resistor TFR2 (e.g., a thin film resistor) which is coupled to generate a first voltage based on local output current 612. In one such embodiment, PCB 600 further comprises another variable resistor TFR1, and a current replica circuit 610 coupled to the resistors TFR1, TFR2. Based on the first voltage, current replica circuit 610 outputs a current which, in combination with similar currents generated by the one or more other PCB circuits, results in signal 614 being at a second voltage, across TFR1, which corresponds to a total amount of current conducted by the phase circuits.

In an embodiment, a comparator 620 of PCB 600 is coupled to variable resistors TFR1, TFR2, wherein comparator 620 generates a signal 622 which indicates a difference between the first voltage and the second voltage (and thus, a difference between the local current and the global current). A pulse PWM duty cycle (DC) adjuster 630 of PCB 600 is coupled to receive both signal 622 and an unadjusted (e.g., pre-adjusted) pulse-width modulated signal 632—e.g., wherein signal 632 is provided by PWM circuitry 512.

Based on signal 622, PWM DC adjuster 630 determines an adjustment to be applied to change a duty cycle of unadjusted PWM signal 632, resulting in an adjusted PWM signal 634 that (for example) is used to generate bridge driver signals for the phase circuits which are "local" to PCB 600.

Figure 6B:
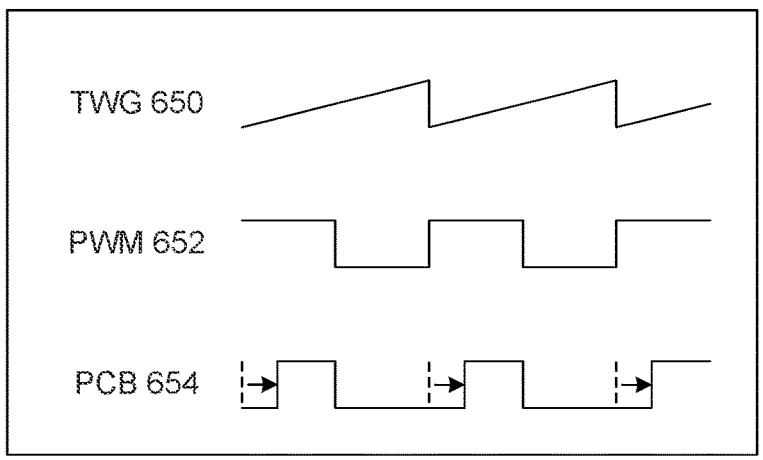
FIG. 6B shows a functional block diagram illustrating features of signals which are variously communicated with a current balancer circuit according to an embodiment.

For example, referring now to FIG. 6B, an unadjusted pulse width modulated signal PWM 652 is generated based on a triangular wave signal TWG 650—e.g., wherein signal TWG 650 corresponds functionally to one of error currents iErr$_{(1-N)}$, and wherein signal PWM 652 corresponds functionally to one of SPM$_{(1-N)}$. In one such embodiment, a phase current balancer circuit generates a duty cycle adjusted signal PCB 654 based on signal PWM 652 and a signal such as signal 622.

Figure 7:
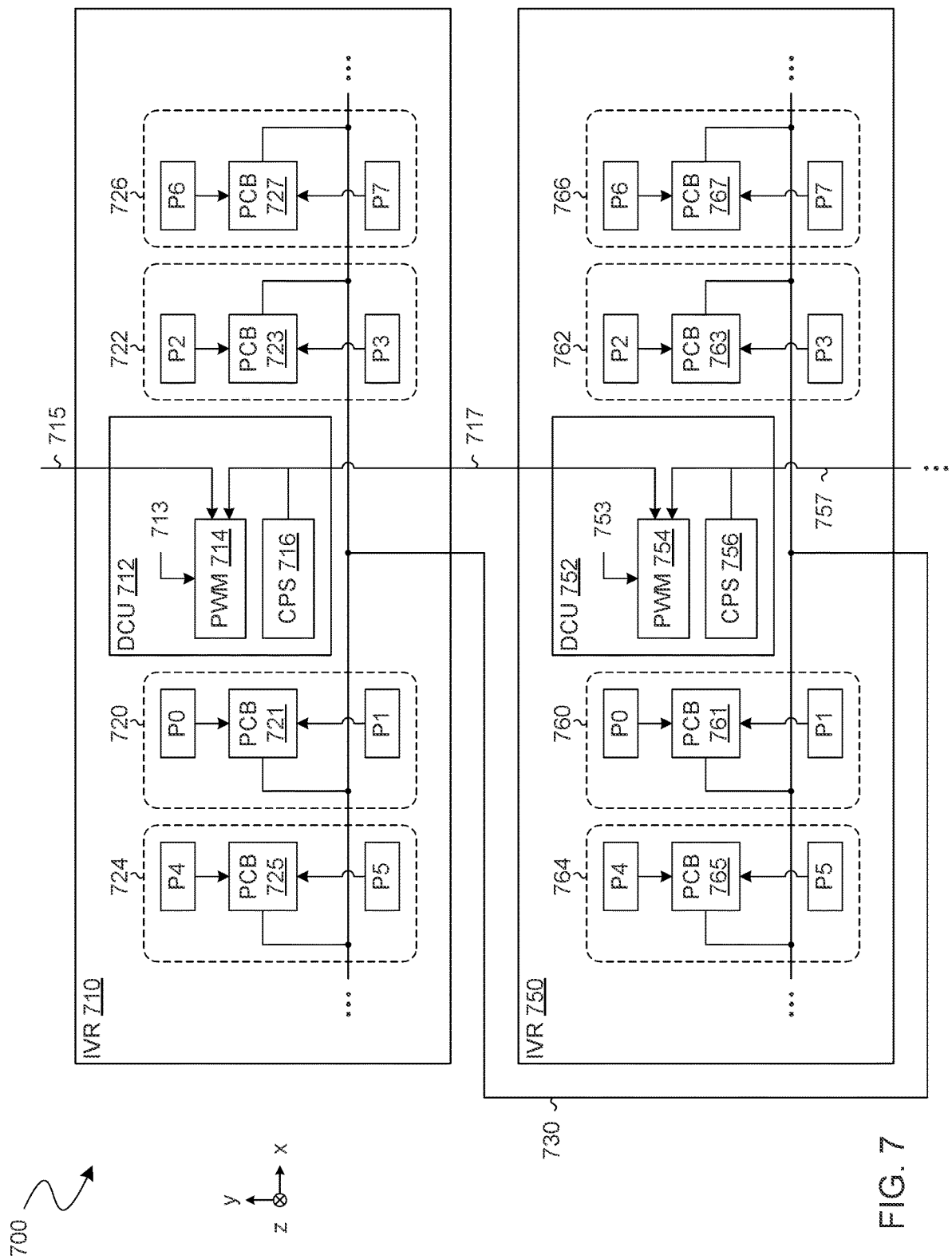
FIG. 7 shows a functional block diagram illustrating features of a system which comprises coupled voltage regulators according to an embodiment.

FIG. 7 shows features of a system 700 comprising multiple voltage regulators which are coupled with each other to deliver power to one or more load circuits according to an embodiment. System 700 illustrates one embodiment wherein voltage regulators are coupled to operate with each other based on shared compensator signal information, and further based on one or more other signals which indicate, for example, an average amount of current provided by respective phase circuits of the voltage regulators. Some or all of the multiple voltage regulators provide functionality such as that which is provided with the voltage regulator of system 100—e.g., wherein a given phase circuit of one such voltage regulator is coupled to provide power via a multi-row, multi-column array of conductive contacts.

As shown in FIG. 7, system 700 comprises a first integrated VR (IVR) 710, and a second IVR 750 coupled thereto. In one embodiment, one or each of IVR 710 and IVR 750 has respective features such as those of IC die 500—e.g., wherein two IC dies each include circuitry of a different respective one of IVRs 710, 750.

In the illustrative embodiment shown, IVR 710 comprises a digital control unit DCU 712 and multiple phase circuits—such as the illustrative phases P0-P7 shown—which are operable to variously conduct current in based on signals from DCU 712. A phase pair 720 of IVR 710 comprises the phases P0, P1 which are positioned opposite each other—e.g., wherein another phase pair 722 comprises the opposing phases P2, P3, another phase pair 724 comprises the opposing phases P4, P5, and another phase pair 726 comprises the opposing phases 6, 7. IVR 710 further comprises phase current balancer circuits PCB 721, PCB 723, PCB 725, and PCB 727 which correspond to—and are variously coupled to—phase pairs 720, 722, 724, and 726 (respectively). In one such embodiment, IVR 710 is provided with an IC die which includes some or all of the features of IC die 500—e.g., wherein DCU 712 corresponds functionally to DCU 510 and PCBs 721, 723, 725, 727 correspond functionally to PCBs 522, 532, 542, 552.

Furthermore, IVR 750 comprises a digital control unit DCU 752 and multiple phase circuits—such as the illustrative phases P0-P7 shown—which are operable to variously conduct current in based on signals from DCU 752. In the illustrative embodiment shown, a phase pair 760 of IVR 750 comprises the opposing phases P0, P1—e.g., wherein another phase pair 762 comprises the opposing phases P2, P3, another phase pair 764 comprises the opposing phases P4, P5, and another phase pair 766 comprises the opposing phases 6, 7. IVR 750 further comprises phase current balancer circuits PCB 761, PCB 763, PCB 765, and PCB 767 which correspond to—and are variously coupled to—phase pairs 760, 762, 764, and 766 (respectively). In one such embodiment, IVR 750 is provided with an IC die which includes some or all of the features of IC die 500—e.g., wherein DCU 752 corresponds functionally to DCU 510 and PCBs 761, 763, 765, 767 correspond functionally to PCBs 522, 532, 542, 552.

In one such embodiment, the respective phase circuits of IVRs 710, 750 are coupled to each other to generate a signal 730 (corresponding functionally to one of signals 518, 614) which indicates a total amount of current being output by said phase circuits. Based on signal 730, PCBs 522, 532, 542, 552, the PCBs 721, 723, 725, 727, 761, 763, 765, and 767 variously generate respective signals to adjust signal modulation which is variously performed with a pulse width modulator (PWM) 754 of DCU 712 and/or with a pulse width modulator (PWM) 754 of DCU 752.

In various embodiments, operation of PWM 714 and PWM 754 is further based on compensation signals 717, 757 which are generated with respective compensator circuits CPS 716, CPS 756 of DCUs 712, 752. In one such embodiment, compensation signals 717, 757, and a primary compensation signal 715 facilitate operations wherein compensator CPS 716 is a primary compensator which controls functionality of compensator CPS 756. Additionally or alternatively, PWM 714 and PWM 754 variously generate, receive or otherwise determine respective control signals 713, 753 which (for example) selectively enable grouping of IVRs 710, 750.

Figure 8:
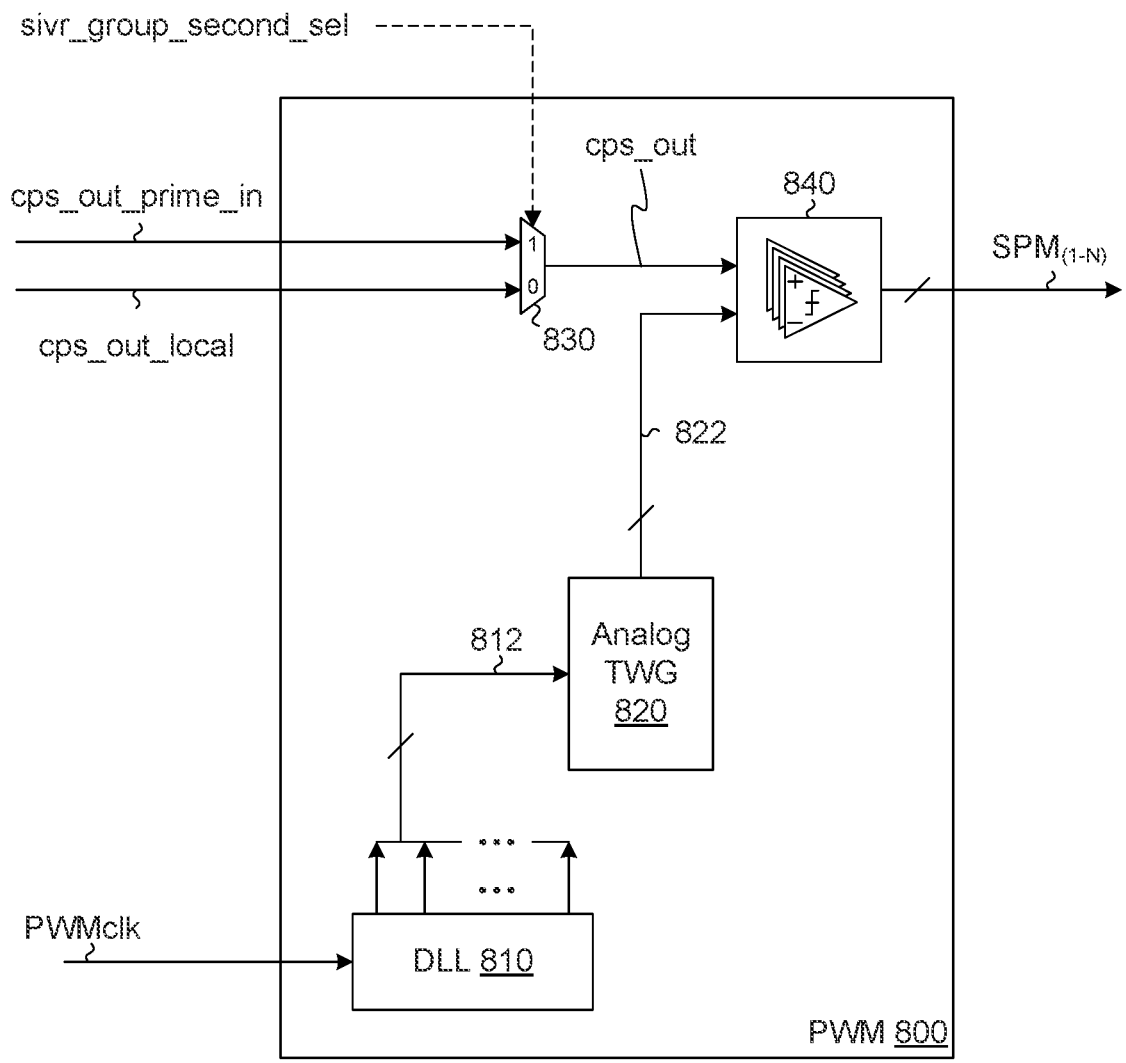
FIG. 8 shows a functional block diagram illustrating features of a circuit to provide pulse width modulation according to an embodiment.

FIG. 8 shows features of a pulse width modulator circuit PWM 800 to determine operations of one or more phase circuits according to an embodiment. PWM 800 illustrates one embodiment wherein a pulse width modulator facilitates voltage regulation with multiple VRs—e.g., including IVRs 710, 750—one of which is to operate as a primary VR, and the other one or more of which are each to operate as a respective secondary VR under the primary VR. PWM 800 provides functionality such as that of PWM 714 or PWM 754, for example As shown in FIG. 8, PWM 800 comprises a delay locked loop circuit DLL 810 to receive a clock signal PWMclk. An analog triangle waveform generator (TWG) circuit 820 of PWM 800 is coupled to receive from DLL 810 periodic signals 812 which each represent a different respective delayed version of the clock signal PWMclk. For each of the signals 812, analog TWG circuit 820 generates a different respective one of multiple triangular waveform signals 822 which (for example) correspond functionally to the voltage signals VTW$_{(1-N)}$ which are output by current mixers 107$_{(1-N)}$. The signals 822 are variously provided each to a respective one of amplifier circuits 840, which are also coupled each to a multiplexer 830 of PWM 800. Based on signals 822, and an output signal cps_out from the multiplexer 830, amplifier circuits 840 each generate a respective one of pulse modulated signals SPM$_{(1-N)}$, such as those generated (for example) by comparators 108$_{(1-N)}$.

In some embodiments, the signal cps_out provided by multiplexer 830 is a selected one of two signals cps_out_prime_in, cps_out_local which, for example, provide functionality such as that of signals 715, 717 (respectively). A given one of the signals cps_out_prime_in, cps_out_local corresponds functionally to the feedback signal Vfb which is generated by compensator 103, for example. In one such embodiment, multiplexer 830 selects between the signals cps_out_prime_in, cps_out_local based on a selection control signal sivr_group_second_sel which—for example—indicates whether the VR which includes PWM 800 is to be configured for operation in combination with another one or more VRs.

In an illustrative scenario according to one embodiment, a VR which includes PWM 800 is to operate as a primary VR, and so sivr_group_second_sel is set to a logic "1" value for multiplexer 830 to select the signal cps_out_prime_in. In one such scenario, the selected signal cps_out_prime_in is set to a high voltage (e.g., the supply voltage Vcc), since the primary VR is not to operate under any other VR. The unselected signal cps_out_local is provided by a compensator circuit of the same VR which includes PWM 800—e.g., wherein PWM 800 is PWM 714 and wherein the signal cps_out_local is provided by compensator CPS 716. However, in one such embodiment, the unselected signal cps_out_local is further provided to a similar PMW circuit of a secondary VR—e.g., wherein the signal cps_out_local is the compensation signal 717 provided to PWM 754 of IVR 750.

In an alternative scenario according to another embodiment, the VR which includes PWM 800 is to operate as a secondary VR, and so sivr_group_second_sel is set to a logic "0" value for multiplexer 830 to select the signal cps_out_local. In this scenario, the selected signal cps_out_local is received from a compensator circuit of the same VR which includes PWM 800. The unselected signal cps_out_prime_in is provided by a compensator circuit of a primary VR (or by another secondary VR which is coupled between the primary VR and the VR which includes PWM 800).

Figure 9:
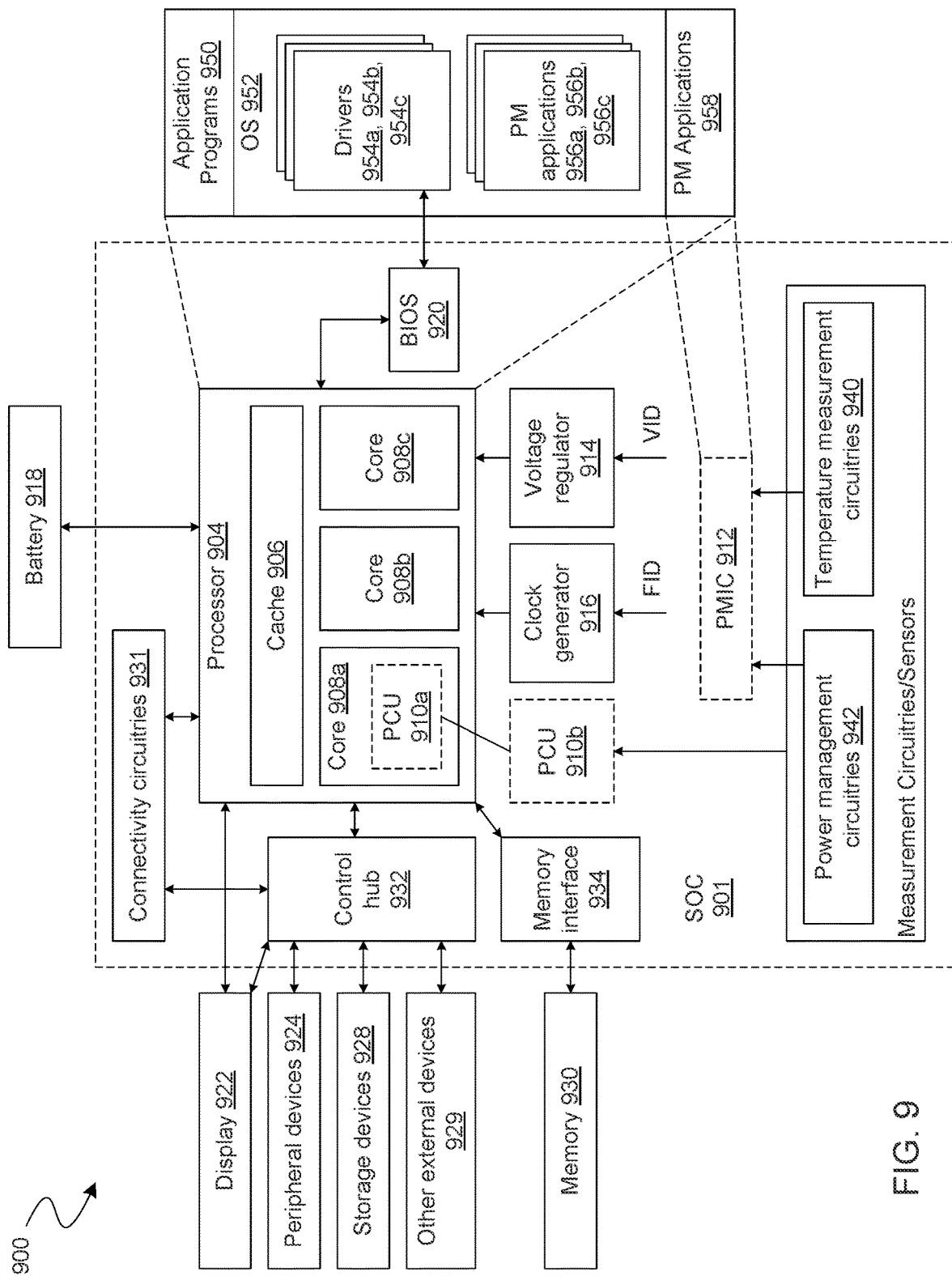
FIG. 9 shows a functional block diagram illustrating features of a computer device which is to facilitate a delivery of power with a voltage regulator according to an embodiment.

FIG. 9 illustrates a computer system or computing device 900 (also referred to as device 900) comprising a voltage regulator which provides one or more currents each to a respective inductor, in accordance with some embodiments. It is pointed out that those elements of FIG. 9 having the same reference numbers (or names) as the elements of any other figure can operate or function in any manner similar to that described, but are not limited to such.

In some embodiments, device 900 represents an appropriate computing device, such as a computing tablet, a mobile phone or smart-phone, a laptop, a desktop, an Internet-of-Things (JOT) device, a server, a wearable device, a set-top box, a wireless-enabled e-reader, or the like. It will be understood that certain components are shown generally, and not all components of such a device are shown in device 900.

In an example, the device 900 comprises a SoC (System-on-Chip) 901. An example boundary of the SOC 901 is illustrated using dotted lines in FIG. 9, with some example components being illustrated to be included within SOC 901—however, SOC 901 may include any appropriate components of device 900.

In some embodiments, device 900 includes processor 904. Processor 904 can include one or more physical devices, such as microprocessors, application processors, microcontrollers, programmable logic devices, processing cores, or other processing means. The processing operations performed by processor 904 include the execution of an operating platform or operating system on which applications and/or device functions are executed. The processing operations include operations related to I/O (input/output) with a human user or with other devices, operations related to power management, operations related to connecting computing device 900 to another device, and/or the like. The processing operations may also include operations related to audio I/O and/or display I/O.

In some embodiments, processor 904 includes multiple processing cores (also referred to as cores) 908*a*, 908*b*, 908*c*. Although merely three cores 908*a*, 908*b*, 908*c* are illustrated in FIG. 9, the processor 904 may include any other appropriate number of processing cores, e.g., tens, or even hundreds of processing cores. Processor cores 908*a*, 908*b*, 908*c* may be implemented on a single integrated circuit (IC) chip. Moreover, the chip may include one or more shared and/or private caches, buses or interconnections, graphics and/or memory controllers, or other components.

In some embodiments, processor 904 includes cache 906. In an example, sections of cache 906 may be dedicated to individual cores 908 (e.g., a first section of cache 906 dedicated to core 908*a*, a second section of cache 906 dedicated to core 908*b*, and so on). In an example, one or more sections of cache 906 may be shared among two or more of cores 908. Cache 906 may be split in different levels, e.g., level 1 (L1) cache, level 2 (L2) cache, level 3 (L3) cache, etc.

In some embodiments, a given processor core (e.g., core 908*a*) may include a fetch unit to fetch instructions (including instructions with conditional branches) for execution by the core 908*a*. The instructions may be fetched from any storage devices such as the memory 930. Processor core 908*a* may also include a decode unit to decode the fetched instruction. For example, the decode unit may decode the fetched instruction into a plurality of micro-operations. Processor core 908*a* may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 908*a* (for example) may be an out-of-order processor core in one embodiment. Processor core 908*a* may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 908*a* may also include a bus unit to enable communication between components of the processor core 908*a* and other components via one or more buses. Processor core 908*a* may also include one or more registers to store data accessed by various components of the core 908*a* (such as values related to assigned apparatus priorities and/or sub-system states (modes) association.

In some embodiments, device 900 comprises connectivity circuitries 931. For example, connectivity circuitries 931 includes hardware devices (e.g., wireless and/or wired connectors and communication hardware) and/or software components (e.g., drivers, protocol stacks), e.g., to enable device 900 to communicate with external devices. Device 900 may be separate from the external devices, such as other computing devices, wireless access points or base stations, etc.

In an example, connectivity circuitries 931 may include multiple different types of connectivity. To generalize, the connectivity circuitries 931 may include cellular connectivity circuitries, wireless connectivity circuitries, etc. Cellular connectivity circuitries of connectivity circuitries 931 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 931 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 931 may include a network interface, such as a wired or wireless interface, e.g., so that a system embodiment may be incorporated into a wireless device, for example, cell phone or personal digital assistant.

In some embodiments, device 900 comprises control hub 932, which represents hardware devices and/or software components related to interaction with one or more I/O devices. For example, processor 904 may communicate with one or more of display 922, one or more peripheral devices 924, storage devices 928, one or more other external devices 929, etc., via control hub 932. Control hub 932 may be a chipset, a Platform Control Hub (PCH), and/or the like.

For example, control hub 932 illustrates one or more connection points for additional devices that connect to device 900, e.g., through which a user might interact with the system. For example, devices (e.g., devices 929) that can be attached to device 900 include microphone devices, speaker or stereo systems, audio devices, video systems or other display devices, keyboard or keypad devices, or other I/O devices for use with specific applications such as card readers or other devices.

As mentioned above, control hub 932 can interact with audio devices, display 922, etc. For example, input through a microphone or other audio device can provide input or commands for one or more applications or functions of device 900. Additionally, audio output can be provided instead of, or in addition to display output. In another example, if display 922 includes a touch screen, display 922 also acts as an input device, which can be at least partially managed by control hub 932. There can also be additional buttons or switches on computing device 900 to provide I/O functions managed by control hub 932. In one embodiment, control hub 932 manages devices such as accelerometers, cameras, light sensors or other environmental sensors, or other hardware that can be included in device 900. The input can be part of direct user interaction, as well as providing environmental input to the system to influence its operations (such as filtering for noise, adjusting displays for brightness detection, applying a flash for a camera, or other features).

In some embodiments, control hub 932 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 922 represents hardware (e.g., display devices) and software (e.g., drivers) components that provide a visual and/or tactile display for a user to interact with device 900. Display 922 may include a display interface, a display screen, and/or hardware device used to provide a display to a user. In some embodiments, display 922 includes a touch screen (or touch pad) device that provides both output and input to a user. In an example, display 922 may communicate directly with the processor 904. Display 922 can be one or more of an internal display device, as in a mobile electronic device or a laptop device or an external display device attached via a display interface (e.g., DisplayPort, etc.). In one embodiment display 922 can be a head mounted display (HMD) such as a stereoscopic display device for use in virtual reality (VR) applications or augmented reality (AR) applications.

In some embodiments and although not illustrated in the figure, in addition to (or instead of) processor 904, device 900 may include Graphics Processing Unit (GPU) comprising one or more graphics processing cores, which may control one or more aspects of displaying contents on display 922.

Control hub 932 (or platform controller hub) may include hardware interfaces and connectors, as well as software components (e.g., drivers, protocol stacks) to make peripheral connections, e.g., to peripheral devices 924.

It will be understood that device 900 could both be a peripheral device to other computing devices, as well as have peripheral devices connected to it. Device 900 may have a "docking" connector to connect to other computing devices for purposes such as managing (e.g., downloading and/or uploading, changing, synchronizing) content on device 900. Additionally, a docking connector can allow device 900 to connect to certain peripherals that allow computing device 900 to control content output, for example, to audiovisual or other systems.

In addition to a proprietary docking connector or other proprietary connection hardware, device 900 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 931 may be coupled to control hub 932, e.g., in addition to, or instead of, being coupled directly to the processor 904. In some embodiments, display 922 may be coupled to control hub 932, e.g., in addition to, or instead of, being coupled directly to processor 904.

In some embodiments, device 900 comprises memory 930 coupled to processor 904 via memory interface 934. Memory 930 includes memory devices for storing information in device 900. Memory can include nonvolatile (state does not change if power to the memory device is interrupted) and/or volatile (state is indeterminate if power to the memory device is interrupted) memory devices. Memory device 930 can be a dynamic random access memory (DRAM) device, a static random access memory (SRAM) device, flash memory device, phase-change memory device, or some other memory device having suitable performance to serve as process memory. In one embodiment, memory 930 can operate as system memory for device 900, to store data and instructions for use when the one or more processors 904 executes an application or process. Memory 930 can store application data, user data, music, photos, documents, or other data, as well as system data (whether long-term or temporary) related to the execution of the applications and functions of device 900.

Elements of various embodiments and examples are also provided as a machine-readable medium (e.g., memory 930) for storing the computer-executable instructions (e.g., instructions to implement any other processes discussed herein). The machine-readable medium (e.g., memory 930) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 900 comprises temperature measurement circuitries 940, e.g., for measuring temperature of various components of device 900. In an example, temperature measurement circuitries 940 may be embedded, or coupled or attached to various components, whose temperature are to be measured and monitored. For example, temperature measurement circuitries 940 may measure temperature of (or within) one or more of cores 908a, 908b, 908c, voltage regulator 914, memory 930, a mother-board of SOC 901, and/or any appropriate component of device 900.

In some embodiments, device 900 comprises power measurement circuitries 942, e.g., for measuring power consumed by one or more components of the device 900. In an example, in addition to, or instead of, measuring power, the power measurement circuitries 942 may measure voltage and/or current. In an example, the power measurement circuitries 942 may be embedded, or coupled or attached to various components, whose power, voltage, and/or current consumption are to be measured and monitored. For example, power measurement circuitries 942 may measure power, current and/or voltage supplied by one or more voltage regulators 914, power supplied to SOC 901, power supplied to device 900, power consumed by processor 904 (or any other component) of device 900, etc.

In some embodiments, device 900 comprises one or more voltage regulator circuitries, generally referred to as voltage regulator (VR) 914. VR 914 generates signals at appropriate voltage levels, which may be supplied to operate any appropriate components of the device 900. Merely as an example, VR 914 is illustrated to be supplying signals to processor 904 of device 900. In some embodiments, VR 914 receives one or more Voltage Identification (VID) signals, and generates the voltage signal at an appropriate level, based on the VID signals. Various type of VRs may be utilized for the VR 914. For example, VR 914 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 910a/b and/or PMIC 912. In some embodiments, each core has a network of distributed LDOs to provide efficient control for power management. The LDOs can be digital, analog, or a combination of digital or analog LDOs.

In some embodiments, device 900 comprises one or more clock generator circuitries, generally referred to as clock generator 916. Clock generator 916 generates clock signals at appropriate frequency levels, which may be supplied to any appropriate components of device 900. Merely as an example, clock generator 916 is illustrated to be supplying clock signals to processor 904 of device 900. In some embodiments, clock generator 916 receives one or more Frequency Identification (FID) signals, and generates the clock signals at an appropriate frequency, based on the FID signals.

In some embodiments, device 900 comprises battery 918 supplying power to various components of device 900. Merely as an example, battery 918 is illustrated to be supplying power to processor 904. Although not illustrated in the figures, device 900 may comprise a charging circuitry, e.g., to recharge the battery, based on Alternating Current (AC) power supply received from an AC adapter.

In some embodiments, device 900 comprises Power Control Unit (PCU) 910 (also referred to as Power Management Unit (PMU), Power Controller, etc.). In an example, some sections of PCU 910 may be implemented by one or more processing cores 908, and these sections of PCU 910 are symbolically illustrated using a dotted box and labelled PCU 910a. In an example, some other sections of PCU 910 may be implemented outside the processing cores 908, and these sections of PCU 910 are symbolically illustrated using a dotted box and labelled as PCU 910b. PCU 910 may implement various power management operations for device 900. PCU 910 may include hardware interfaces, hardware circuitries, connectors, registers, etc., as well as software components (e.g., drivers, protocol stacks), to implement various power management operations for device 900.

In some embodiments, device 900 comprises Power Management Integrated Circuit (PMIC) 912, e.g., to implement various power management operations for device 900. In some embodiments, PMIC 912 is a Reconfigurable Power Management ICs (RPMICs) and/or an IMVP (Intel® Mobile Voltage Positioning). In an example, the PMIC is within an IC chip separate from processor 904. The may implement various power management operations for device 900. PMIC 912 may include hardware interfaces, hardware circuitries, connectors, registers, etc., as well as software components (e.g., drivers, protocol stacks), to implement various power management operations for device 900.

In an example, device 900 comprises one or both PCU 910 or PMIC 912. In an example, any one of PCU 910 or PMIC 912 may be absent in device 900, and hence, these components are illustrated using dotted lines.

Various power management operations of device 900 may be performed by PCU 910, by PMIC 912, or by a combination of PCU 910 and PMIC 912. For example, PCU 910 and/or PMIC 912 may select a power state (e.g., P-state) for various components of device 900. For example, PCU 910 and/or PMIC 912 may select a power state (e.g., in accordance with the ACPI (Advanced Configuration and Power Interface) specification) for various components of device 900. Merely as an example, PCU 910 and/or PMIC 912 may cause various components of the device 900 to transition to a sleep state, to an active state, to an appropriate C state (e.g., C0 state, or another appropriate C state, in accordance with the ACPI specification), etc. In an example, PCU 910 and/or PMIC 912 may control a voltage output by VR 914 and/or a frequency of a clock signal output by the clock generator, e.g., by outputting the VID signal and/or the FID signal, respectively. In an example, PCU 910 and/or PMIC 912 may control battery power usage, charging of battery 918, and features related to power saving operation.

The clock generator 916 can comprise a phase locked loop (PLL), frequency locked loop (FLL), or any suitable clock source. In some embodiments, each core of processor 904 has its own clock source. As such, each core can operate at a frequency independent of the frequency of operation of the other core. In some embodiments, PCU 910 and/or PMIC 912 performs adaptive or dynamic frequency scaling or adjustment. For example, clock frequency of a processor core can be increased if the core is not operating at its maximum power consumption threshold or limit. In some embodiments, PCU 910 and/or PMIC 912 determines the operating condition of each core of a processor, and opportunistically adjusts frequency and/or power supply voltage of that core without the core clocking source (e.g., PLL of that core) losing lock when the PCU 910 and/or PMIC 912 determines that the core is operating below a target performance level. For example, if a core is drawing current from a power supply rail less than a total current allocated for that core or processor 904, then PCU 910 and/or PMIC 912 can temporarily increase the power draw for that core or processor 904 (e.g., by increasing clock frequency and/or power supply voltage level) so that the core or processor 904 can perform at a higher performance level. As such, voltage and/or frequency can be increased temporality for processor 904 without violating product reliability.

In an example, PCU 910 and/or PMIC 912 may perform power management operations, e.g., based at least in part on receiving measurements from power measurement circuitries 942, temperature measurement circuitries 940, charge level of battery 918, and/or any other appropriate information that may be used for power management. To that end, PMIC 912 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 910 and/or PMIC 912 in at least one embodiment to allow PCU 910 and/or PMIC 912 to manage processor core energy at least in part based on value(s) detected by one or more of the sensors.

Also illustrated is an example software stack of device 900 (although not all elements of the software stack are illustrated). Merely as an example, processors 904 may execute application programs 950, Operating System 952, one or more Power Management (PM) specific application programs (e.g., generically referred to as PM applications 958), and/or the like. PM applications 958 may also be executed by the PCU 910 and/or PMIC 912. OS 952 may also include one or more PM applications 956*a*, 956*b*, 956*c*. The OS 952 may also include various drivers 954*a*, 954*b*, 954*c*, etc., some of which may be specific for power management purposes. In some embodiments, device 900 may further comprise a Basic Input/Output System (BIOS) 920. BIOS 920 may communicate with OS 952 (e.g., via one or more drivers 954), communicate with processors 904, etc.

For example, one or more of PM applications 958, 956, drivers 954, BIOS 920, etc. may be used to implement power management specific tasks, e.g., to control voltage and/or frequency of various components of device 900, to control wake-up state, sleep state, and/or any other appropriate power state of various components of device 900, control battery power usage, charging of the battery 918, features related to power saving operation, etc.

In various embodiments, device 900 provides functionality to efficiently accommodate a scalable delivery of current to multiple inductors which are included in, or are coupled to operate with, a voltage regulator. For example, in one such embodiment, VR 914 includes some or all of the features of VR 130—e.g., wherein structures of VR 914 are provided with integrated circuitry such as that of one of IC dies 200, 300, 400, 500.

Numerous details are described herein to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Techniques and architectures for operating a voltage regulator are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, an integrated circuit (IC) die comprises a hardware interface comprising first conductive contacts which are each to couple the IC die to a first inductor, a digital controller to generate a first one or more driver signals, and a first phase circuit comprising a first plurality of cells each comprising a respective bridge circuit, and a respective switch circuit, wherein, for each of the first plurality of cells, the digital controller is to indicate, to the respective switch circuit, whether to provide a respective one or more conductive paths to enable the cell to conduct a current with a corresponding one of the first conductive contacts, wherein the current is to be generated with the respective bridge circuit based on the first one or more driver signals, wherein the first plurality of cells are each coupled to a different respective one of the first conductive contacts, and wherein the first conductive contacts are arranged relative to each other as a first array which comprises first rows and first columns.

In one or more second embodiments, further to the first embodiment, the first plurality of cells are arranged relative to each other as a second array which comprises second rows and second columns.

In one or more third embodiments, further to the first embodiment or the second embodiment, the first phase circuit is one of multiple phase circuits of the IC die, wherein the multiple phase circuits each comprise a respective plurality of cells each comprising a respective bridge circuit and a respective switch circuit, wherein the multiple phase circuits comprise a first plurality of phase circuits which are each in a first region, and a second plurality of phase circuits which are each in a second region, wherein the first region and the second region extend on opposite respective sides of the digital controller.

In one or more fourth embodiments, further to any of the first through third embodiments, the first phase circuit comprises a first cell which is coupled to a first conductive contact of the first plurality of conductive contacts, wherein the first cell comprises a first bridge circuit and a first switch circuit, wherein the first switch circuit is operable to selectively provide or prevent a conductive path between an output of the first bridge circuit and the first conductive contact.

In one or more fifth embodiments, further to any of the first through third embodiments, the first phase circuit comprises a first cell which is coupled to a first conductive contact of the first plurality of conductive contacts, wherein the first cell comprises a first bridge circuit and a first switch circuit, wherein the first switch circuit is operable to selectively provide or prevent a conductive path between an input of the first bridge circuit and the digital controller.

In one or more sixth embodiments, further to any of the first through third embodiments, the first phase circuit is one of multiple phase circuits of the IC die, wherein the multiple phase circuits each comprise a respective plurality of cells each comprising a respective bridge circuit and a respective switch circuit, wherein the digital controller comprises a pulse width modulator, the IC die further comprising a plurality of current balance circuits each corresponding to a different respective two or more phase circuits of the multiple phase circuits, wherein the plurality of current balance circuits are coupled to each other to generate a first indication of a first total amount of current output by multiple phase circuits comprising the plurality of phase circuits, for each current balance circuit of the plurality of current balance circuits the current balance circuit is further coupled to receive a respective second indication of a respective second total amount of current output by the corresponding two or more phase circuits, the current balance circuit is to generate, based on the first indication and the respective second indication, a respective signal which indicates an adjustment to be made to a respective signal from the pulse width modulator.

In one or more seventh embodiments, further to the sixth embodiment, for each current balance circuit of the plurality of current balance circuits, the current balance circuit is to generate the respective signal based on a difference between the first indication to the respective second indication.

In one or more eighth embodiments, further to the seventh embodiment, the hardware interface comprises multiple conductive contacts each to couple the IC die to a respective one of a plurality of inductors, a first voltage regulator is to comprise the plurality of inductors, the digital controller, the plurality of phase circuits, and the plurality of current balance circuits, the digital controller is a first digital controller which comprises a first pulse width modulator, and a first compensator circuit coupled to the first pulse width modulator, wherein the first compensator circuit to further couple to a second digital controller of a second voltage regulator, the second digital controller is to generate a pulse width modulated signal, the first compensator circuit is further to generate a compensation signal to indicate, to the second digital controller, a duty cycle to be provided with the pulse width modulated signal.

In one or more ninth embodiments, further to the eighth embodiment, the plurality of phase circuits is a first plurality of phase circuits, the plurality of current balance circuits is a first plurality of current balance circuits, the second voltage regulator is to further comprise a second plurality of phase circuits, and a second plurality of current balance circuits each corresponding to a different respective two or more phase circuits of the second plurality of phase circuits, the first plurality of current balance circuits are further to couple to the second plurality of current balance, wherein the multiple phase circuits are to further comprise the second plurality of phase circuits, the first plurality of phase circuits is to generate the first indication with the second plurality of phase circuits.

In one or more tenth embodiments, an integrated circuit (IC) die comprises a hardware interface comprising multiple contacts, phase circuits which each correspond to a different respective plurality of contacts of the hardware interface, the phase circuits each comprising a respective plurality of cells, wherein, for each of the phase circuits, the respective plurality of cells of the phase circuit are each coupled to a different respective contact of the corresponding plurality of contacts, wherein the corresponding plurality of contacts are arranged relative to each other as an array which comprises multiple rows and multiple columns, and a digital controller coupled to the phase circuits, wherein, for each phase circuit of one or more of the phase circuits, the digital controller is to provide a respective pair of driver signals to the phase circuit, and select a respective one or more cells of the phase circuit each to output a respective current based on the respective pair of driver signals, wherein the phase circuits comprise a first plurality of phase circuits which are each in a first region, and a second plurality of phase circuits which are each in a second region, wherein the first region and the second region extend on opposite respective sides of the digital controller.

In one or more eleventh embodiments, further to the tenth embodiment, for each of the phase circuits, the respective plurality of cells of the phase circuit are arranged relative to each other as a cell array which comprises multiple cell rows and multiple cell columns.

In one or more twelfth embodiments, further to the tenth embodiment or the eleventh embodiment, for each of the phase circuits, the plurality of cells of the phase circuit each comprising a respective bridge circuit and a respective switch circuit, wherein the phase circuits comprise a first plurality of phase circuits which are each in a first region, and a second plurality of phase circuits which are each in a second region, wherein the first region and the second region extend on opposite respective sides of the digital controller.

In one or more thirteenth embodiments, further to any of the tenth through twelfth embodiments, a first phase circuit of the phase circuits comprises a first cell which is coupled to a first conductive contact of the hardware interface, wherein the first cell comprises a first bridge circuit and a first switch circuit, wherein the first switch circuit is operable to selectively provide or prevent a conductive path between an output of the first bridge circuit and the first conductive contact.

In one or more fourteenth embodiments, further to any of the tenth through twelfth embodiments, a first phase circuit of the phase circuits comprises a first cell which is coupled to a first conductive contact of the hardware interface, wherein the first cell comprises a first bridge circuit and a first switch circuit, wherein the first switch circuit is operable to selectively provide or prevent a conductive path between an input of the first bridge circuit and the digital controller.

In one or more fifteenth embodiments, further to any of the tenth through twelfth embodiments, for each of the phase circuits, the respective plurality of cells of the phase circuit each comprising a respective bridge circuit and a respective switch circuit, wherein the digital controller comprises a pulse width modulator, the IC die further comprising a plurality of current balance circuits each corresponding to a different respective two or more of the phase circuits, wherein the plurality of current balance circuits are coupled to each other to generate a first indication of a first total amount of current output by multiple phase circuits, for each current balance circuit of the plurality of current balance circuits the current balance circuit is further coupled to receive a respective second indication of a respective second total amount of current output by the corresponding two or more phase circuits, the current balance circuit is to generate, based on the first indication and the respective second indication, a respective signal which indicates an adjustment to be made to a respective signal from the pulse width modulator.

In one or more sixteenth embodiments, further to the fifteenth embodiment, for each current balance circuit of the plurality of current balance circuits, the current balance circuit is to generate the respective signal based on a difference between the first indication to the respective second indication.

In one or more seventeenth embodiments, further to the fifteenth embodiment, the multiple conductive contacts are each to couple the IC die to a respective one of a plurality of inductors, a first voltage regulator is to comprise the plurality of inductors, the digital controller, the phase circuits, and the plurality of current balance circuits, the digital controller is a first digital controller which comprises a first pulse width modulator, and a first compensator circuit coupled to the first pulse width modulator, wherein the first compensator circuit to further couple to a second digital controller of a second voltage regulator, the second digital controller is to generate a pulse width modulated signal, the first compensator circuit is further to generate a compensation signal to indicate, to the second digital controller, a duty cycle to be provided with the pulse width modulated signal.

In one or more eighteenth embodiments, further to the seventeenth embodiment, the phase circuits are a first plurality of phase circuits, the plurality of current balance circuits is a first plurality of current balance circuits, the second voltage regulator is to further comprise a second plurality of phase circuits, and a second plurality of current balance circuits each corresponding to a different respective two or more phase circuits of the second plurality of phase circuits, the first plurality of current balance circuits are further to couple to the second plurality of current balance, wherein the phase circuits are to further comprise the second plurality of phase circuits, the first plurality of phase circuits is to generate the first indication with the second plurality of phase circuits.

In one or more nineteenth embodiments, a system comprises multiple inductors comprising a first inductor, an integrated circuit (IC) die comprising a hardware interface coupled to the multiple inductors, the hardware interface comprising first conductive contacts which are each coupled the first inductor, a digital controller to generate a first one or more driver signals, and a first phase circuit comprising a first plurality of cells each comprising a respective bridge circuit, and a respective switch circuit, wherein, for each of the first plurality of cells, the digital controller is to indicate, to the respective switch circuit, whether to provide a respective one or more conductive paths to enable the cell to conduct a current with a corresponding one of the first conductive contacts, wherein the current is to be generated with the respective bridge circuit based on the first one or more driver signals, wherein the first plurality of cells are each coupled to a different respective one of the first conductive contacts, and wherein the first conductive contacts are arranged relative to each other as a first array which comprises first rows and first columns, a load circuit coupled to receive power from the IC die and the multiple inductors.

In one or more twentieth embodiments, further to the nineteenth embodiment, the first plurality of cells are arranged relative to each other as a second array which comprises second rows and second columns.

In one or more twenty-first embodiments, further to the nineteenth embodiment or the twentieth embodiment, the first phase circuit is one of multiple phase circuits of the IC die, wherein the multiple phase circuits each comprise a respective plurality of cells each comprising a respective bridge circuit and a respective switch circuit, wherein the multiple phase circuits comprise a first plurality of phase circuits which are each in a first region, and a second plurality of phase circuits which are each in a second region, wherein the first region and the second region extend on opposite respective sides of the digital controller.

In one or more twenty-second embodiments, further to any of the nineteenth through twenty-first embodiments, the first phase circuit comprises a first cell which is coupled to a first conductive contact of the first plurality of conductive contacts, wherein the first cell comprises a first bridge circuit and a first switch circuit, wherein the first switch circuit is operable to selectively provide or prevent a conductive path between an output of the first bridge circuit and the first conductive contact.

In one or more twenty-third embodiments, further to any of the nineteenth through twenty-first embodiments, the first phase circuit comprises a first cell which is coupled to a first conductive contact of the first plurality of conductive contacts, wherein the first cell comprises a first bridge circuit and a first switch circuit, wherein the first switch circuit is operable to selectively provide or prevent a conductive path between an input of the first bridge circuit and the digital controller.

In one or more twenty-fourth embodiments, further to any of the nineteenth through twenty-first embodiments, the first phase circuit is one of multiple phase circuits of the IC die, wherein the multiple phase circuits each comprise a respective plurality of cells each comprising a respective bridge circuit and a respective switch circuit, wherein the digital controller comprises a pulse width modulator, the IC die further comprising a plurality of current balance circuits each corresponding to a different respective two or more phase circuits of the multiple phase circuits, wherein the plurality of current balance circuits are coupled to each other to generate a first indication of a first total amount of current output by multiple phase circuits comprising the plurality of phase circuits, for each current balance circuit of the plurality of current balance circuits the current balance circuit is further coupled to receive a respective second indication of a respective second total amount of current output by the corresponding two or more phase circuits, the current balance circuit is to generate, based on the first indication and the respective second indication, a respective signal which indicates an adjustment to be made to a respective signal from the pulse width modulator.

In one or more twenty-fifth embodiments, further to the twenty-fourth embodiment, for each current balance circuit of the plurality of current balance circuits, the current balance circuit is to generate the respective signal based on a difference between the first indication to the respective second indication.

In one or more twenty-sixth embodiments, further to the twenty-fourth embodiment, the hardware interface comprises multiple conductive contacts each to couple the IC die to a respective one of a plurality of inductors, a first voltage regulator is to comprise the plurality of inductors, the digital controller, the plurality of phase circuits, and the plurality of current balance circuits, the digital controller is a first digital controller which comprises a first pulse width modulator, and a first compensator circuit coupled to the first pulse width modulator, wherein the first compensator circuit to further couple to a second digital controller of a second voltage regulator, the second digital controller is to generate a pulse width modulated signal, the first compensator circuit is further to generate a compensation signal to indicate, to the second digital controller, a duty cycle to be provided with the pulse width modulated signal.

In one or more twenty-seventh embodiments, further to the twenty-fifth embodiment, the plurality of phase circuits is a first plurality of phase circuits, the plurality of current balance circuits is a first plurality of current balance circuits, the second voltage regulator is to further comprise a second plurality of phase circuits, and a second plurality of current balance circuits each corresponding to a different respective two or more phase circuits of the second plurality of phase circuits, the first plurality of current balance circuits are further to couple to the second plurality of current balance, wherein the multiple phase circuits are to further comprise the second plurality of phase circuits, the first plurality of phase circuits is to generate the first indication with the second plurality of phase circuits.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) die comprising:
   a hardware interface comprising first conductive contacts which are each to couple the IC die to a first inductor;
   a digital controller to generate a first one or more driver signals; and
   a first phase circuit comprising a first plurality of cells each comprising:
      a bridge circuit; and
      a switch circuit;
   wherein, for each of the first plurality of cells, the digital controller is to indicate, to the switch circuit, whether to provide a respective one or more conductive paths to enable the cell to conduct a current with a corresponding one of the first conductive contacts, wherein the current is to be generated with the bridge circuit based on the first one or more driver signals;
   wherein the first plurality of cells are each coupled to a different one of the first conductive contacts, and wherein the first conductive contacts are arranged relative to each other as a first array which comprises first rows and first columns.

2. The IC die of claim 1, wherein the first plurality of cells are arranged relative to each other as a second array which comprises second rows and second columns.

3. The IC die of claim 1, wherein the first phase circuit is one of multiple phase circuits of the IC die, wherein the multiple phase circuits each comprise a respective plurality of cells each comprising a respective bridge circuit and a respective switch circuit, wherein the multiple phase circuits comprise:
   a first plurality of phase circuits which are each in a first region; and
   a second plurality of phase circuits which are each in a second region;
   wherein the first region and the second region extend on opposite respective sides of the digital controller.

4. The IC die of claim 1, wherein the first phase circuit comprises a first cell which is coupled to a first conductive contact of the first plurality of conductive contacts, wherein the first cell comprises a first bridge circuit and a first switch circuit, wherein the first switch circuit is operable to selectively provide or prevent a conductive path between an output of the first bridge circuit and the first conductive contact.

5. The IC die of claim 1, wherein the first phase circuit comprises a first cell which is coupled to a first conductive contact of the first plurality of conductive contacts, wherein the first cell comprises a first bridge circuit and a first switch circuit, wherein the first switch circuit is operable to selectively provide or prevent a conductive path between an input of the first bridge circuit and the digital controller.

6. The IC die of claim 1, wherein the first phase circuit is one of multiple phase circuits of the IC die, wherein the multiple phase circuits each comprise a respective plurality of cells each comprising a respective bridge circuit and a respective switch circuit, wherein the digital controller comprises a pulse width modulator, the IC die further comprising:
a plurality of current balance circuits each corresponding to a different respective two or more phase circuits of the multiple phase circuits, wherein:
the plurality of current balance circuits are coupled to each other to generate a first indication of a first total amount of current output by multiple phase circuits comprising the plurality of phase circuits;
for each current balance circuit of the plurality of current balance circuits:
the current balance circuit is further coupled to receive a respective second indication of a respective second total amount of current output by the corresponding two or more phase circuits;
the current balance circuit is to generate, based on the first indication and the respective second indication, a respective signal which indicates an adjustment to be made to a respective signal from the pulse width modulator.

7. The IC die of claim 6, wherein, for each current balance circuit of the plurality of current balance circuits, the current balance circuit is to generate the respective signal based on a difference between the first indication to the respective second indication.

8. The IC die of claim 6, wherein:
the hardware interface comprises multiple conductive contacts each to couple the IC die to a respective one of a plurality of inductors;
a first voltage regulator is to comprise the plurality of inductors, the digital controller, the plurality of phase circuits, and the plurality of current balance circuits;
the digital controller is a first digital controller which comprises:
a first pulse width modulator; and
a first compensator circuit coupled to the first pulse width modulator, wherein the first compensator circuit to further couple to a second digital controller of a second voltage regulator;
the second digital controller is to generate a pulse width modulated signal;
the first compensator circuit is further to generate a compensation signal to indicate, to the second digital controller, a duty cycle to be provided with the pulse width modulated signal.

9. The IC die of claim 8, wherein:
the plurality of phase circuits is a first plurality of phase circuits;
the plurality of current balance circuits is a first plurality of current balance circuits;
the second voltage regulator is to further comprise:
a second plurality of phase circuits; and
a second plurality of current balance circuits each corresponding to a different respective two or more phase circuits of the second plurality of phase circuits;
the first plurality of current balance circuits are further to couple to the second plurality of current balance,
wherein the multiple phase circuits are to further comprise the second plurality of phase circuits;
the first plurality of phase circuits is to generate the first indication with the second plurality of phase circuits.

10. An integrated circuit (IC) die comprising:
a hardware interface comprising multiple contacts;
phase circuits which each correspond to a different respective plurality of contacts of the hardware interface, the phase circuits each comprising a respective plurality of cells, wherein, for each of the phase circuits, the respective plurality of cells of the phase circuit are each coupled to a different respective contact of the corresponding plurality of contacts, wherein the corresponding plurality of contacts are arranged relative to each other as an array which comprises multiple rows and multiple columns; and
a digital controller coupled to the phase circuits, wherein, for each phase circuit of one or more of the phase circuits, the digital controller is to:
provide a respective pair of driver signals to the phase circuit; and
select a respective one or more cells of the phase circuit each to output a respective current based on the respective pair of driver signals;
wherein the phase circuits comprise a first plurality of phase circuits which are each in a first region, and a second plurality of phase circuits which are each in a second region, wherein the first region and the second region extend on opposite respective sides of the digital controller.

11. The IC die of claim 10, wherein, for each of the phase circuits, the respective plurality of cells of the phase circuit are arranged relative to each other as a cell array which comprises multiple cell rows and multiple cell columns.

12. The IC die of claim 10, wherein, for each of the phase circuits, the plurality of cells of the phase circuit each comprising a respective bridge circuit and a respective switch circuit, wherein the phase circuits comprise:
a first plurality of phase circuits which are each in a first region; and
a second plurality of phase circuits which are each in a second region;
wherein the first region and the second region extend on opposite respective sides of the digital controller.

13. The IC die of claim 10, wherein a first phase circuit of the phase circuits comprises a first cell which is coupled to a first conductive contact of the hardware interface, wherein the first cell comprises a first bridge circuit and a first switch circuit, wherein the first switch circuit is operable to selectively provide or prevent a conductive path between an output of the first bridge circuit and the first conductive contact.

14. The IC die of claim 10, wherein, for each of the phase circuits, the respective plurality of cells of the phase circuit each comprising a respective bridge circuit and a respective switch circuit, wherein the digital controller comprises a pulse width modulator, the IC die further comprising:
a plurality of current balance circuits each corresponding to a different respective two or more of the phase circuits, wherein:
the plurality of current balance circuits are coupled to each other to generate a first indication of a first total amount of current output by multiple phase circuits;
for each current balance circuit of the plurality of current balance circuits:
the current balance circuit is further coupled to receive a respective second indication of a respective second total amount of current output by the corresponding two or more phase circuits;

the current balance circuit is to generate, based on the first indication and the respective second indication, a respective signal which indicates an adjustment to be made to a respective signal from the pulse width modulator.

15. The IC die of claim 14, wherein:

the multiple conductive contacts are each to couple the IC die to a respective one of a plurality of inductors;

a first voltage regulator is to comprise the plurality of inductors, the digital controller, the phase circuits, and the plurality of current balance circuits;

the digital controller is a first digital controller which comprises:
  a first pulse width modulator; and
  a first compensator circuit coupled to the first pulse width modulator, wherein the first compensator circuit to further couple to a second digital controller of a second voltage regulator;

the second digital controller is to generate a pulse width modulated signal;

the first compensator circuit is further to generate a compensation signal to indicate, to the second digital controller, a duty cycle to be provided with the pulse width modulated signal.

16. The IC die of claim 15, wherein:

the phase circuits are a first plurality of phase circuits;

the plurality of current balance circuits is a first plurality of current balance circuits;

the second voltage regulator is to further comprise:
  a second plurality of phase circuits; and
  a second plurality of current balance circuits each corresponding to a different respective two or more phase circuits of the second plurality of phase circuits;

the first plurality of current balance circuits are further to couple to the second plurality of current balance, wherein the phase circuits are to further comprise the second plurality of phase circuits;

the first plurality of phase circuits is to generate the first indication with the second plurality of phase circuits.

17. A system comprising:

multiple inductors comprising a first inductor;

an integrated circuit (IC) die comprising:
  a hardware interface coupled to the multiple inductors, the hardware interface comprising first conductive contacts which are each coupled the first inductor;
  a digital controller to generate a first one or more driver signals; and
  a first phase circuit comprising a first plurality of cells each comprising:
    a respective bridge circuit; and
    a respective switch circuit;
  wherein, for each of the first plurality of cells, the digital controller is to indicate, to the respective switch circuit, whether to provide a respective one or more conductive paths to enable the cell to conduct a current with a corresponding one of the first conductive contacts, wherein the current is to be generated with the respective bridge circuit based on the first one or more driver signals;
  wherein the first plurality of cells are each coupled to a different respective one of the first conductive contacts, and wherein the first conductive contacts are arranged relative to each other as a first array which comprises first rows and first columns;
  a load circuit coupled to receive power from the IC die and the multiple inductors.

18. The system of claim 17, wherein the first phase circuit is one of multiple phase circuits of the IC die, wherein the multiple phase circuits each comprise a respective plurality of cells each comprising a respective bridge circuit and a respective switch circuit, wherein the multiple phase circuits comprise:
  a first plurality of phase circuits which are each in a first region; and
  a second plurality of phase circuits which are each in a second region;
wherein the first region and the second region extend on opposite respective sides of the digital controller.

19. The system of claim 17, wherein the first phase circuit comprises a first cell which is coupled to a first conductive contact of the first plurality of conductive contacts, wherein the first cell comprises a first bridge circuit and a first switch circuit, wherein the first switch circuit is operable to selectively provide or prevent a conductive path between an output of the first bridge circuit and the first conductive contact.

20. The system of claim 17, wherein the first phase circuit is one of multiple phase circuits of the IC die, wherein the multiple phase circuits each comprise a respective plurality of cells each comprising a respective bridge circuit and a respective switch circuit, wherein the digital controller comprises a pulse width modulator, the IC die further comprising:
  a plurality of current balance circuits each corresponding to a different respective two or more phase circuits of the multiple phase circuits, wherein:
    the plurality of current balance circuits are coupled to each other to generate a first indication of a first total amount of current output by multiple phase circuits comprising the plurality of phase circuits;
    for each current balance circuit of the plurality of current balance circuits:
      the current balance circuit is further coupled to receive a respective second indication of a respective second total amount of current output by the corresponding two or more phase circuits;
      the current balance circuit is to generate, based on the first indication and the respective second indication, a respective signal which indicates an adjustment to be made to a respective signal from the pulse width modulator.

* * * * *